United States Patent
Chen et al.

(10) Patent No.: US 12,058,637 B2
(45) Date of Patent: Aug. 6, 2024

(54) COMMUNICATION METHOD AND COMMUNICATION DEVICE

(71) Applicant: HUAWEI TECHNOLOGIES CO., LTD., Shenzhen (CN)

(72) Inventors: Lei Chen, Chengdu (CN); Shitong Yuan, Chengdu (CN); Su Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 199 days.

(21) Appl. No.: 17/403,221

(22) Filed: Aug. 16, 2021

(65) Prior Publication Data

US 2021/0377892 A1 Dec. 2, 2021

Related U.S. Application Data

(63) Continuation of application No. PCT/CN2020/074871, filed on Feb. 12, 2020.

(30) Foreign Application Priority Data

Feb. 15, 2019 (CN) .......................... 201910118299.3

(51) Int. Cl.
*H04W 56/00* (2009.01)
*H04L 5/00* (2006.01)

(52) U.S. Cl.
CPC ......... *H04W 56/005* (2013.01); *H04L 5/0051* (2013.01); *H04W 56/001* (2013.01)

(58) Field of Classification Search
CPC ........... H04W 56/001; H04W 56/0005; H04W 56/004; H04W 56/0045; H04W 56/005; H04W 56/0055; H04W 56/0065
See application file for complete search history.

(56) References Cited

U.S. PATENT DOCUMENTS 9,648,573 B2   5/2017 Siomina et al.
2012/0287917 A1* 11/2012 Chin ................. H04W 36/0058
                                                  370/347

(Continued)

FOREIGN PATENT DOCUMENTS

CN   102088763 A   6/2011
CN   102143586 A   8/2011

(Continued)

OTHER PUBLICATIONS

European Search Report issued in corresponding European Application No. 20755455.1, dated Mar. 2, 2022, pp. 1-17.

(Continued)

*Primary Examiner* — Pao Sinkantarakorn
(74) *Attorney, Agent, or Firm* — HAUPTMAN HAM, LLP

(57) ABSTRACT

This application provides a communication method and a communication device. The method includes: A terminal device obtains an uplink timing advance TA of a serving cell. The terminal device obtains a downlink signal time difference between the serving cell and a neighboring cell. The terminal device obtains an uplink TA of the neighboring cell based on the uplink TA of the serving cell and the downlink signal time difference. The terminal device sends an uplink signal to the neighboring cell based on a downlink subframe timing and the uplink TA of the neighboring cell. The uplink TA of the neighboring cell is obtained, so that the terminal device can send the uplink signal to the neighboring cell based on the uplink TA of the neighboring cell.

20 Claims, 15 Drawing Sheets

(56) References Cited

U.S. PATENT DOCUMENTS

| | | | |
|---|---|---|---|
| 2013/0195084 A1 | 8/2013 | Chen et al. | |
| 2013/0244640 A1* | 9/2013 | Viorel | H04W 56/0045 |
| | | | 455/422.1 |
| 2014/0029586 A1 | 1/2014 | Loehr et al. | |
| 2015/0373660 A1* | 12/2015 | Gunnarsson | H04L 5/0058 |
| | | | 370/350 |
| 2016/0095092 A1 | 3/2016 | Khoryaev et al. | |
| 2016/0204927 A1* | 7/2016 | Yi | H04B 7/2615 |
| | | | 370/280 |
| 2017/0359790 A1* | 12/2017 | Wang | H04J 11/005 |
| 2019/0053193 A1 | 2/2019 | Park et al. | |
| 2020/0275398 A1* | 8/2020 | Da | H04L 5/0092 |
| 2021/0168871 A1* | 6/2021 | Lee | H04L 7/0033 |

FOREIGN PATENT DOCUMENTS

| | | |
|---|---|---|
| CN | 102340797 A | 2/2012 |
| CN | 102550097 A | 7/2012 |
| CN | 102740443 A | 10/2012 |
| CN | 103609177 A | 2/2014 |
| CN | 103917887 A | 7/2014 |
| CN | 104583803 A | 4/2015 |
| CN | 106031256 A | 10/2016 |
| CN | 106576330 A | 4/2017 |
| CN | 108289334 A | 7/2018 |
| CN | 107872856 B | 10/2020 |
| KR | 20120117726 A | 10/2012 |
| KR | 20130137643 A | 12/2013 |
| KR | 20170066380 A | 6/2017 |

OTHER PUBLICATIONS

3GPP TS 38.331 V15.4.0 (Dec. 2018), 3rd Generation Partnership Project; Technical Specification Group Radio Access Network; NR; Radio Resource Control (RRC) protocol specification(Release 15), 474 pages.

Chinese Office Action issued in corresponding Chinese Application No. 201910118299.3, dated Feb. 3, 2021, pp. 1-9.

Chinese Office Action issued in corresponding Chinese Application No. 201910118299.3, dated Aug. 4, 2021, pp. 1-5.

International Search Report issued in corresponding International Application No. PCT/CN2020/074871, dated May 9, 2020, pp. 1-9.

India Examination Report issued in corresponding India Application No. 202127038320, dated Mar. 25, 2022, pp. 1-6.

Korean Notice of Allowance issued in corresponding Korean Application No. 10-2021-7029625, dated Jun. 30, 2023, pp. 1-4.

* cited by examiner

COMMUNICATION METHOD AND COMMUNICATION DEVICE

CROSS-REFERENCE TO RELATED APPLICATIONS

This application is a continuation of International Application No. PCT/CN2020/074871, filed on Feb. 12, 2020, which claims priority to Chinese Patent Application No. 201910118299.3, filed on Feb. 15, 2019, The disclosures of the aforementioned applications are hereby incorporated by reference in their entireties.

TECHNICAL FIELD

This application relates to the communication field, and more specifically, to a communication method and a communication device.

BACKGROUND

In some communication systems, such as a long term evolution (LTE) system, a future 5th generation (5G) system, or a new radio (NR) system, for both an uplink time difference of arrival (UTDOA) positioning measurement and a round-trip time (RTT) positioning measurement, a timing advance (TA) for sending an uplink reference signal to a neighboring cell by a terminal device is sent based on a TA of a serving cell.

In this way, an uplink reference signal sent by the terminal device to a neighboring cell may cause interference to the neighboring cell.

SUMMARY

This application provides a communication method and a communication device, to reduce interference to a neighboring cell caused by an uplink reference signal sent by a terminal device, and improve performance of communication between the terminal device and the neighboring cell.

According to a first aspect, a communication method is provided. The method may be performed by a terminal device, or may be performed by a chip or circuit configured in the terminal device. This is not limited in this application.

The method may include: obtaining an uplink timing advance TA of a serving cell; obtaining a downlink signal time difference between the serving cell and at least one neighboring cell; obtaining an uplink TA of the at least one neighboring cell based on the uplink TA of the serving cell and the downlink signal time difference; and sending an uplink signal to the at least one neighboring cell based on a downlink subframe timing and the uplink TA of the at least one neighboring cell.

Based on the foregoing technical solution, the terminal device may send the uplink signal to the neighboring cell based on the uplink TA of the neighboring cell, so that the terminal device can send the uplink signal to the neighboring cell at relatively accurate time, thereby reducing interference to the neighboring cell caused by the uplink signal sent by the terminal device. The uplink TA of the serving cell may also be understood as reference time, which is described in detail below. The terminal device determines the uplink TA of the neighboring cell by using the obtained reference time and the downlink signal time difference between the reference time and the neighboring cell, so that the terminal device determines the uplink TA of the neighboring cell when needing to send the uplink signal to the neighboring cell. Flexibility of communication between the terminal device and the neighboring cell may be further improved.

With reference to the first aspect, in some implementations of the first aspect, the uplink TA of the neighboring cell is a sum of the uplink TA of the serving cell and the downlink signal time difference.

Based on the foregoing technical solution, the terminal device compensates for the uplink TA of the serving cell by using the downlink signal time difference. That is, the terminal device may determine that the uplink TA of the neighboring cell is the sum of the uplink TA of the serving cell and the downlink signal time difference, to quickly determine the uplink TA of the neighboring cell.

With reference to the first aspect, in some implementations of the first aspect, the obtaining an uplink TA of a serving cell includes: receiving a timing advance group TAG from a network device, where the TAG includes the uplink TA of the serving cell; and obtaining the uplink TA of the serving cell from the TAG.

Based on the foregoing technical solution, the terminal device may obtain the uplink TA of the serving cell by using a timing advance group (TAG) configured by the network device for the terminal device, for example, an initially assigned value or an adjusted value. By obtaining the uplink TA of the serving cell by using the configuration by the network device, the terminal device may quickly determine the uplink TA of the serving cell, and then determine the uplink TA of the neighboring cell.

With reference to the first aspect, in some implementations of the first aspect, the uplink TA of the serving cell is: a time difference between receive time when the terminal device receives a downlink subframe i of the serving cell and transmit time when the terminal device sends an uplink subframe i to the serving cell, where i is an integer greater than or equal to 0.

Based on the foregoing technical solution, the uplink TA of the serving cell may be a cell-level Rx-Tx time difference, where Rx is an uplink frame timing of the serving cell, and Tx is a downlink frame timing associated with the serving cell. To be specific, the uplink TA of the serving cell may be a time difference between receive time when the terminal device receives a downlink subframe i of the serving cell and transmit time when the terminal device sends an uplink subframe i to the serving cell.

With reference to the first aspect, in some implementations of the first aspect, the uplink TA of the serving cell is: a time difference between a receive timing that is of a downlink subframe j and that is determined by reception of a downlink signal of the serving cell by the terminal device and a transmit timing that is of an uplink subframe j and that is determined by transmission of an uplink signal to the serving cell by the terminal device, where j is an integer greater than or equal to 0.

Based on the foregoing technical solution, the uplink TA of the serving cell may be a reference signal-level Rx-Tx time difference, where Rx is an uplink frame timing of a reference signal, and Tx is a downlink frame timing associated with the reference signal. To be specific, the uplink TA of the serving cell may be a time difference between a receive timing that is of a downlink subframe j and that is determined by reception of a reference signal by the terminal device and a transmit timing that is of an uplink subframe j and that is determined by transmission of another reference signal by the terminal device.

With reference to the first aspect, in some implementations of the first aspect, the uplink TA of the serving cell is: a time difference between receive time when the terminal device receives a downlink subframe k of the serving cell and a transmit timing that is of an uplink subframe k and that is determined by transmission of an uplink signal to the serving cell by the terminal device; or a time difference between a receive timing that is of a downlink subframe k and that is determined by reception of a downlink signal by the terminal device and transmit time when the terminal device sends an uplink subframe k to the serving cell, where k is an integer greater than or equal to 0.

Based on the foregoing technical solution, the uplink TA of the serving cell may be a time difference between a cell-level Rx-Tx timing and a reference signal-level Rx-Tx timing. For example, Rx may be an uplink frame timing of a reference signal of the serving cell, and Tx may be a downlink frame timing associated with the serving cell. To be specific, the uplink TA of the serving cell may be a time difference between a receive timing that is of a downlink subframe k and that is determined by reception of a reference signal from the serving cell by the terminal device and transmit time when the terminal device sends an uplink subframe k to the serving cell. For another example, Rx may be an uplink frame timing of the serving cell, and Tx may be a downlink frame timing associated with a reference signal of the serving cell. To be specific, the uplink TA of the serving cell may be a time difference between receive time when the terminal device receives a downlink subframe k of the serving cell and a transmit timing that is of an uplink subframe k and that is determined by transmission of a reference signal to the serving cell by the terminal device.

With reference to the first aspect, in some implementations of the first aspect, the sending an uplink signal to the at least one neighboring cell based on a downlink subframe timing and the uplink TA of the at least one neighboring cell includes: sending the uplink signal to the neighboring cell based on the downlink subframe timing, the uplink TA of the neighboring cell, and a cell timing offset, where the cell timing offset is a subframe timing offset between the serving cell and the neighboring cell.

Based on the foregoing solution, considering that there may be a subframe timing offset between the serving cell and the neighboring cell, when sending the uplink signal to the neighboring cell, the terminal device may comprehensively consider the downlink subframe timing, the uplink TA of the neighboring cell, and the cell timing offset (namely, the subframe timing offset), so that the terminal device sends the uplink signal to the neighboring cell at more accurate time, thereby improving performance of communication between the terminal device and the neighboring cell.

With reference to the first aspect, in some implementations of the first aspect, the downlink subframe timing is any one of the following: a downlink subframe timing of a primary cell, a downlink subframe timing of the serving cell, or a downlink subframe timing of the neighboring cell.

The primary cell (SpCell, or may also be referred to as a special cell (special cell)) may be a primary cell (primary cell, PCell) for a master base station or a master node (MN); and the primary cell may be a primary secondary cell (PSCell) for a secondary base station or a secondary node (SN).

Based on the foregoing technical solution, the downlink subframe timing may be the downlink subframe timing of the primary cell, the downlink subframe timing of the serving cell, the downlink subframe timing of the neighboring cell, or the like. The downlink subframe timing may be a default value, or may be specified by the network device.

With reference to the first aspect, in some implementations of the first aspect, the obtaining an uplink TA of the at least one neighboring cell includes: obtaining an uplink TA of a target neighboring cell, where the at least one neighboring cell includes a plurality of neighboring cells, and the target neighboring cell is one or more of the plurality of neighboring cells; and the sending an uplink signal to the at least one neighboring cell based on a downlink subframe timing and the uplink TA of the at least one neighboring cell includes: sending the uplink signal to the plurality of neighboring cells based on a downlink subframe timing and the uplink TA of the target neighboring cell, where the target neighboring cell includes: a neighboring cell whose uplink TA is closest to the uplink TA of the serving cell and that is in the plurality of neighboring cells; a neighboring cell with a highest priority in the plurality of neighboring cells, or a neighboring cell with a highest reference signal received power RSRP in the plurality of neighboring cells; or a neighboring cell with a lowest priority in the plurality of neighboring cells, or a neighboring cell with a lowest RSRP in the plurality of neighboring cells.

Based on the foregoing technical solution, when the terminal device sends the uplink signal to the plurality of neighboring cells, an uplink TA of any one of the neighboring cells may be used, or a neighboring cell may be selected according to a specific condition or rule, where an uplink TA of the neighboring cell is used.

With reference to the first aspect, in some implementations of the first aspect, before the sending an uplink signal to the at least one neighboring cell based on a downlink subframe timing and the uplink TA of the at least one neighboring cell, the method includes: performing modulo and/or quantization processing on the uplink TA of the neighboring cell.

Based on the foregoing technical solution, after determining the uplink TA of the neighboring cell based on the uplink TA of the serving cell and the downlink signal time difference, the terminal device may first perform processing, such as modulo and/or quantization processing, on the uplink TA.

According to a second aspect, a communication method is provided. The method may be performed by a terminal device, or may be performed by a chip or circuit configured in the terminal device. This is not limited in this application.

The method may include: obtaining an uplink timing advance TA of a neighboring cell; receiving configuration information of an uplink reference signal from a location management device or a serving cell, where the uplink reference signal is a reference signal sent by the terminal device to the neighboring cell; and sending, to the neighboring cell based on a downlink subframe timing and the uplink TA of the neighboring cell, the uplink reference signal indicated by the configuration information of the uplink reference signal.

Based on the foregoing technical solution, the terminal device sends the uplink reference signal to the neighboring cell based on the obtained uplink TA of the neighboring cell and the configuration information of the uplink reference signal obtained from the location management device or the serving cell, so that the terminal device can send the uplink reference signal to the neighboring cell at relatively accurate time, thereby reducing interference to the neighboring cell caused by the uplink signal sent by the terminal device, and improving performance of communication between the terminal device and the neighboring cell.

With reference to the second aspect, in some implementations of the second aspect, the method includes: receiving or prestoring one or more of the following information: a correspondence between an identifier of the uplink reference signal and the uplink TA of the neighboring cell; a correspondence between an identifier of a set of the uplink reference signal and the uplink TA of the neighboring cell; a correspondence between an identifier of the neighboring cell and the uplink TA of the neighboring cell; or a correspondence between a set of a plurality of identifiers of the neighboring cell and the uplink TA of the neighboring cell.

Based on the foregoing technical solution, the terminal device may pre-store or receive a correspondence related to the uplink TA of the neighboring cell, so that when sending the uplink reference signal to the neighboring cell, the terminal device can determine an uplink TA of a corresponding neighboring cell based on the correspondence.

With reference to the second aspect, in some implementations of the second aspect, the obtaining an uplink TA of a neighboring cell includes: obtaining the uplink TA of the neighboring cell based on the uplink reference signal sent to the neighboring cell and the correspondence between an identifier of the uplink reference signal and the uplink TA of the neighboring cell; obtaining the uplink TA of the neighboring cell based on a set to which the uplink reference signal sent to the neighboring cell belongs and the correspondence between an identifier of a set of the uplink reference signal and the uplink TA of the neighboring cell; obtaining the uplink TA of the neighboring cell based on the neighboring cell to which the uplink reference signal is sent and the correspondence between an identifier of the neighboring cell and the uplink TA of the neighboring cell; or obtaining the uplink TA of the neighboring cell based on the correspondence between a set of a plurality of identifiers of the neighboring cell and the uplink TA of the neighboring cell and a set to which the neighboring cell belongs, where the uplink reference signal is sent to the neighboring cell.

Based on the foregoing technical solution, the terminal device may determine the uplink TA of the neighboring cell based on a prestored or received correspondence related to the uplink TA of the neighboring cell and in combination with the uplink reference signal sent to the neighboring cell, the set to which the uplink reference signal sent to the neighboring cell belongs, the neighboring cell to which the uplink reference signal is sent, or the set to which the neighboring cell belongs. Therefore, each neighboring cell or an uplink TA corresponding to each reference signal does not need to be sent to the terminal device, thereby reducing signaling overheads and improving efficiency.

With reference to the second aspect, in some implementations of the second aspect, the method further includes: obtaining the downlink subframe timing, where the obtaining the downlink subframe timing specifically includes: receiving information about the downlink subframe timing; or receiving a downlink reference signal, and obtaining the downlink subframe timing based on time of the downlink reference signal, where the downlink reference signal is received from the serving cell or the neighboring cell.

Based on the foregoing technical solution, the terminal device may receive the information about the downlink subframe timing, or may determine, based on the received downlink reference signal, that the downlink reference signal may be sent by the serving cell to the terminal device, or may be sent by a target cell of uplink transmission of the terminal device to the terminal device.

With reference to the second aspect, in some implementations of the second aspect, the downlink subframe timing is any one of the following: a downlink subframe timing of a primary cell, a downlink subframe timing of the serving cell, or a downlink subframe timing of the neighboring cell.

Based on the foregoing technical solution, the downlink subframe timing may alternatively be the downlink subframe timing of the primary cell, the downlink subframe timing of the serving cell, or the downlink subframe timing of the neighboring cell. The downlink subframe timing may be a default value, or may be specified.

With reference to the second aspect, in some implementations of the second aspect, the uplink reference signal is a sounding reference signal SRS used for positioning, and the configuration information of the uplink reference signal includes one or more of the following information: an identifier of a resource of the SRS, a quantity of ports of the resource of the SRS, a port number of a phase tracking reference signal PT-RS associated with the resource of the SRS, comb configuration information and a sequence cyclic shift that are of the resource of the SRS, a start symbol index of the resource of the SRS, a quantity of consecutive symbols and a repetition factor that are of the resource of the SRS, an index of a start resource block RB of the resource of the SRS, frequency hopping configuration information of the resource of the SRS, a bandwidth of the SRS, sequence group hopping and sequence hopping that are of the resource of the SRS, periodic configuration information of the resource of the SRS, and spatial filtering information of the resource of the SRS.

With reference to the second aspect, in some implementations of the second aspect, the method further includes: receiving the identifier of the neighboring cell from the location management device or the serving cell.

Based on the foregoing technical solution, the terminal device may determine, based on a received identifier of at least one neighboring cell, a neighboring cell or neighboring cells to which the uplink reference signal is sent.

According to a third aspect, a communication method is provided. The method may be performed by a location management device, or may be performed by a chip or circuit configured in the location management device. This is not limited in this application.

The method may include: determining an uplink timing advance TA of a neighboring cell; receiving configuration information of an uplink reference signal from a serving cell of a terminal device, where the uplink reference signal is a reference signal sent by the terminal device to the neighboring cell; and sending the configuration information of the uplink reference signal and indication information of the uplink TA of the neighboring cell to the terminal device.

Based on the foregoing technical solution, the location management device may determine the uplink TA of the neighboring cell, and send the uplink TA of the neighboring cell to the terminal device, so that the terminal device may send the uplink reference signal to the neighboring cell based on the uplink TA of the neighboring cell. Therefore, the terminal device can send the uplink reference signal to the neighboring cell at relatively accurate time, thereby reducing interference to the neighboring cell caused by the uplink signal sent by the terminal device, and improving performance of communication between the terminal device and the neighboring cell.

With reference to the third aspect, in some implementations of the third aspect, the sending the configuration information of the uplink reference signal and indication information of the uplink TA of the neighboring cell to the terminal device includes: sending, to the terminal device, the configuration information of the uplink reference signal and one or more of the following information: a correspondence between an identifier of the uplink reference signal and the uplink TA of the neighboring cell; a correspondence between an identifier of a set of the uplink reference signal and the uplink TA of the neighboring cell; a correspondence between an identifier of the neighboring cell and the uplink TA of the neighboring cell; or a correspondence between a set of a plurality of identifiers of the neighboring cell and the uplink TA of the neighboring cell.

Based on the foregoing technical solution, the location management device may send, to the terminal device, a correspondence related to the uplink TA of the neighboring cell, avoiding sending each reference signal or an uplink TA corresponding to each neighboring cell to the terminal device. Therefore, when sending the uplink reference signal to the neighboring cell, the terminal device can determine an uplink TA of a corresponding neighboring cell based on the correspondence. In addition, signaling overheads can also be reduced.

With reference to the third aspect, in some implementations of the third aspect, the method further includes: sending information about a downlink subframe timing to the terminal device, where the downlink subframe timing is any one of the following: a downlink subframe timing of a primary cell, a downlink subframe timing of the serving cell, or a downlink subframe timing of the neighboring cell.

Based on the foregoing technical solution, the location management device may notify the terminal device of the information about a downlink subframe timing, so that the terminal device quickly determines, based on the information, a timing for sending the uplink reference signal to the neighboring cell, thereby improving efficiency.

With reference to the third aspect, in some implementations of the third aspect, the method further includes: sending a measurement request message to the neighboring cell or the serving cell, where the measurement request message is used to request the neighboring cell or the serving cell to report time when the uplink reference signal is received.

With reference to the third aspect, in some implementations of the third aspect, the determining an uplink TA of a neighboring cell includes: obtaining location information of the terminal device, and determining the uplink TA of the neighboring cell based on the location information of the terminal device; determining the uplink TA of the neighboring cell based on transmission of preamble information to the neighboring cell by the terminal device; or obtaining an uplink TA of the serving cell and a downlink signal time difference, and determining the uplink TA of the neighboring cell based on the uplink TA of the serving cell and the downlink signal time difference, where the downlink signal time difference is a downlink signal time difference between the uplink TA of the serving cell and the uplink TA of the neighboring cell.

Based on the foregoing technical solution, the location management device may determine the uplink TA of the neighboring cell by using the location information of the terminal device; may determine the uplink TA of the neighboring cell based on transmission of the preamble information to the neighboring cell by the terminal device; or may determine the uplink TA of the neighboring cell based on the uplink TA of the serving cell and the downlink signal time difference. In this way, the uplink TA of the neighboring cell can be conveniently and quickly determined.

With reference to the third aspect, in some implementations of the third aspect, the obtaining location information of the terminal device includes: obtaining the location information of the terminal device in a global positioning system GPS manner or an enhanced cell identification E-CID manner; or obtaining the location information of the terminal device based on a beam measurement result of the neighboring cell reported by the terminal device.

With reference to the third aspect, in some implementations of the third aspect, the uplink reference signal is a sounding reference signal SRS used for positioning, and the configuration information of the uplink reference signal includes one or more of the following information: an identifier of a resource of the SRS, a quantity of ports of the resource of the SRS, a port number of a phase tracking reference signal PT-RS associated with the resource of the SRS, comb configuration information and a sequence cyclic shift that are of the resource of the SRS, a start symbol index of the resource of the SRS, a quantity of consecutive symbols and a repetition factor that are of the resource of the SRS, an index of a start resource block RB of the resource of the SRS, frequency hopping configuration information of the resource of the SRS, a bandwidth of the SRS, sequence group hopping and sequence hopping that are of the resource of the SRS, periodic configuration information of the resource of the SRS, and spatial filtering information of the resource of the SRS.

With reference to the third aspect, in some implementations of the third aspect, the method further includes sending the identifier of the neighboring cell to the terminal device.

Based on the foregoing technical solution, an identifier of at least one neighboring cell is sent to the terminal device, so that the terminal device may determine, based on the received identifier of the neighboring cell, a neighboring cell or neighboring cells to which the uplink reference signal is sent.

According to a fourth aspect, a communication method is provided. The method may be performed by a network device (for example, a serving base station), or may be performed by a chip or circuit configured in the network device (for example, the serving base station). This is not limited in this application.

The method may include: sending configuration information of an uplink reference signal to a location management device; determining an uplink timing advance TA of a neighboring cell; sending indication information of the uplink TA of the neighboring cell to a terminal device; and receiving, from the terminal device, the uplink reference signal indicated by the configuration information of the uplink reference signal.

Based on the foregoing technical solution, a serving cell or a serving base station may determine the uplink TA of the neighboring cell, and send the uplink TA of the neighboring cell to the terminal device, so that the terminal device may send the uplink reference signal to the neighboring cell based on the uplink TA of the neighboring cell. Therefore, the terminal device can send the uplink reference signal to the neighboring cell at relatively accurate time, thereby reducing interference to the neighboring cell caused by the uplink signal sent by the terminal device, and improving performance of communication between the terminal device and the neighboring cell.

With reference to the fourth aspect, in some implementations of the fourth aspect, the sending indication information of the uplink TA of the neighboring cell to a terminal device includes: sending, to the terminal device, one or more of the following information: a correspondence between an identifier of the uplink reference signal and the uplink TA of the neighboring cell; a correspondence between an identifier of a set of the uplink reference signal and the uplink TA of the neighboring cell; a correspondence between an identifier of the neighboring cell and the uplink TA of the neighboring cell; or a correspondence between a set of a plurality of identifiers of the neighboring cell and the uplink TA of the neighboring cell.

Based on the foregoing technical solution, the serving cell may send, to the terminal device, a correspondence related to the uplink TA of the neighboring cell, avoiding sending each reference signal or an uplink TA corresponding to each neighboring cell to the terminal device. Therefore, when sending the uplink reference signal to the neighboring cell, the terminal device can determine an uplink TA of a corresponding neighboring cell based on the correspondence. In addition, signaling overheads can also be reduced.

With reference to the fourth aspect, in some implementations of the fourth aspect, the method further includes: sending information about a downlink subframe timing to the terminal device, where the downlink subframe timing is any one of the following: a downlink subframe timing of a primary cell, a downlink subframe timing of the serving cell, or a downlink subframe timing of the neighboring cell.

Based on the foregoing technical solution, the serving cell may notify the terminal device of the information about a downlink subframe timing, so that the terminal device quickly determines, based on the information, a timing for sending the uplink reference signal to the neighboring cell, thereby improving efficiency.

With reference to the fourth aspect, in some implementations of the fourth aspect, the method further includes: receiving a measurement request message from the location management device, where the measurement request message is used to request the serving cell to report time when the uplink reference signal is received.

With reference to the fourth aspect, in some implementations of the fourth aspect, the determining an uplink TA of a neighboring cell includes: obtaining location information of the terminal device, and determining the uplink TA of the neighboring cell based on the location information of the terminal device; determining the uplink TA of the neighboring cell based on transmission of preamble information to the neighboring cell by the terminal device; or obtaining an uplink TA of the serving cell and a downlink signal time difference, and determining the uplink TA of the neighboring cell based on the uplink TA of the serving cell and the downlink signal time difference, where the downlink signal time difference is a downlink signal time difference between the uplink TA of the serving cell and the uplink TA of the neighboring cell.

Based on the foregoing technical solution, the serving cell may determine the uplink TA of the neighboring cell by using the location information of the terminal device; may determine the uplink TA of the neighboring cell based on transmission of the preamble information to the neighboring cell by the terminal device; or may determine the uplink TA of the neighboring cell based on the uplink TA of the serving cell and the downlink signal time difference. In this way, the uplink TA of the neighboring cell can be conveniently and quickly determined.

With reference to the fourth aspect, in some implementations of the fourth aspect, the obtaining location information of the terminal device includes: obtaining the location information of the terminal device in a GPS manner or an E-CID manner; or obtaining the location information of the terminal device based on a beam measurement result of the neighboring cell reported by the terminal device.

With reference to the fourth aspect, in some implementations of the fourth aspect, the uplink reference signal is a sounding reference signal SRS used for positioning, and the configuration information of the uplink reference signal includes one or more of the following information: an identifier of a resource of the SRS, a quantity of ports of the resource of the SRS, a port number of a phase tracking reference signal PT-RS associated with the resource of the SRS, comb configuration information and a sequence cyclic shift that are of the resource of the SRS, a start symbol index of the resource of the SRS, a quantity of consecutive symbols and a repetition factor that are of the resource of the SRS, an index of a start resource block RB of the resource of the SRS, frequency hopping configuration information of the resource of the SRS, a bandwidth of the SRS, sequence group hopping and sequence hopping that are of the resource of the SRS, periodic configuration information of the resource of the SRS, and spatial filtering information of the resource of the SRS.

With reference to the fourth aspect, in some implementations of the fourth aspect, the method further includes sending the identifier of the neighboring cell to the terminal device.

Based on the foregoing technical solution, an identifier of at least one neighboring cell is sent to the terminal device, so that the terminal device may determine, based on the received identifier of the neighboring cell, a neighboring cell or neighboring cells to which the uplink reference signal is sent.

According to a fifth aspect, a communication apparatus is provided. The communication apparatus is configured to perform the method provided in the first aspect or the second aspect. Optionally, the communication apparatus may include modules configured to perform the method provided in the first aspect or the second aspect.

According to a sixth aspect, a communication apparatus is provided. The communication apparatus is configured to perform the method provided in the third aspect. Optionally, the communication apparatus may include modules configured to perform the method provided in the third aspect.

According to a seventh aspect, a communication apparatus is provided. The communication apparatus is configured to perform the method provided in the fourth aspect. Optionally, the communication apparatus may include modules configured to perform the method provided in the fourth aspect.

According to an eighth aspect, a communication apparatus is provided. The communication apparatus includes a memory and a processor. The memory is configured to store instructions. The processor is configured to execute the instructions stored in the memory, and execution of the instructions stored in the memory enables the processor to perform the method provided in the first aspect or the second aspect.

According to a ninth aspect, a communication apparatus is provided. The communication apparatus includes a memory and a processor. The memory is configured to store instructions. The processor is configured to execute the instructions stored in the memory, and execution of the instructions stored in the memory enables the processor to perform the method provided in the third aspect.

According to a tenth aspect, a communication apparatus is provided. The communication apparatus includes a memory and a processor. The memory is configured to store instructions. The processor is configured to execute the instructions stored in the memory, and execution of the instructions stored in the memory enables the processor to perform the method provided in the fourth aspect.

According to an eleventh aspect, a chip is provided. The chip includes a processing module and a communication interface. The processing module is configured to control the communication interface to communicate with the outside, and the processing module is further configured to implement the method provided in the first aspect, the second aspect, the third aspect, or the fourth aspect.

According to a twelfth aspect, a computer-readable storage medium is provided. The computer-readable storage medium stores a computer program. When the computer program is executed by a computer, the computer is enabled to perform the method provided in the first aspect, the second aspect, the third aspect, or the fourth aspect.

According to a thirteenth aspect, a computer program product including instructions is provided. When the instructions are executed by a computer, the computer is enabled to perform the method provided in the first aspect, the second aspect, the third aspect, or the fourth aspect.

According to a fourteenth aspect, a communication system is provided, and includes the communication apparatus according to the fifth aspect, the sixth aspect, or the seventh aspect, or includes the communication apparatus according to the eighth aspect, the ninth aspect, or the tenth aspect.

In conclusion, according to this application, the terminal device obtains the uplink TA of the neighboring cell, and sends the uplink signal to the neighboring cell based on the uplink TA of the neighboring cell, so that the terminal device can send the uplink signal to the neighboring cell at relatively accurate time, thereby reducing interference to the serving cell caused by the uplink signal sent by the terminal device to the neighboring cell.

DESCRIPTION OF EMBODIMENTS

The following describes technical solutions of this application with reference to the accompanying drawings.

The technical solutions of embodiments of this application may be applied to various communication systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD), a universal mobile telecommunications system (UMTS), a worldwide interoperability for microwave access (WiMAX) communication system, a future 5th generation (5G) system, or a new radio (NR) system.

For ease of understanding the embodiments of this application, network architectures applicable to the embodiments of this application are described in detail with reference to FIG. 1 and FIG. 2.

Figure 1:
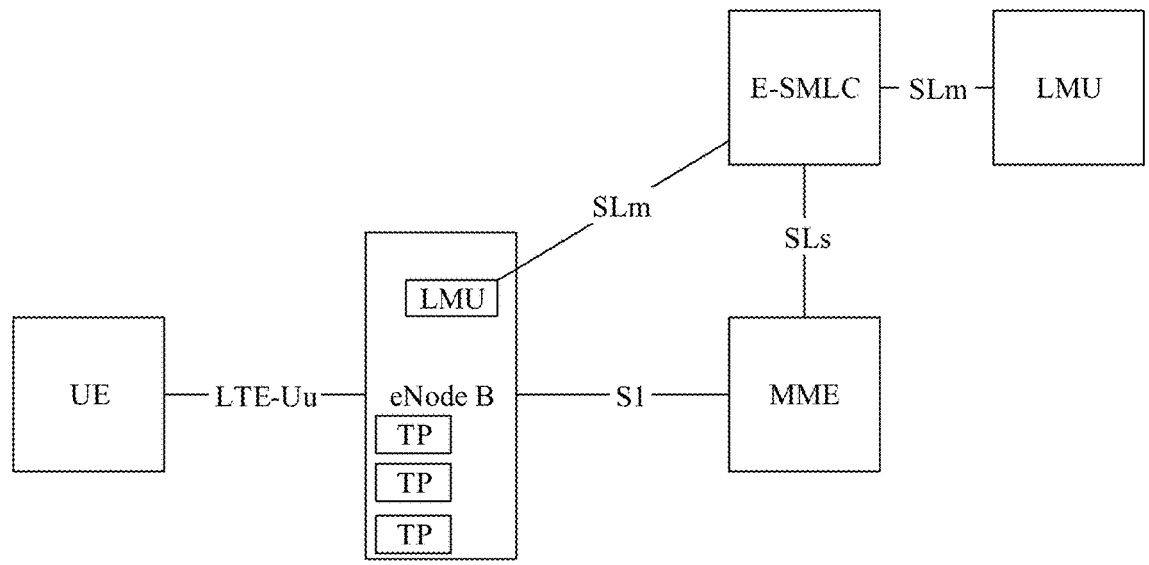
FIG. 1 and FIG. 2 are schematic diagrams of architectures applicable to embodiments of this application.

FIG. 1 is a schematic diagram of an architecture 100 applicable to an embodiment of this application. As shown in FIG. 1, the network architecture may specifically include the following network elements:

1. A terminal device: The terminal device may be referred to as user equipment (UE), a terminal, an access terminal, a subscriber unit, a subscriber station, a mobile station, a mobile station, a remote station, a remote terminal, a mobile device, a user terminal, a wireless communication device, a user agent, or a user apparatus. The terminal device in the embodiments of this application may include various handheld devices, vehicle-mounted devices, wearable devices, or computing devices that have a wireless communication function, or other processing devices connected to a wireless modem. The terminal device may be a mobile station (MS), a subscriber unit, a cellular phone, a smartphone, a wireless data card, a personal digital assistant (PDA) computer, a tablet computer, a wireless modem, a handset, a laptop computer, a machine type communication (MTC) terminal, or the like.

Figure 2:
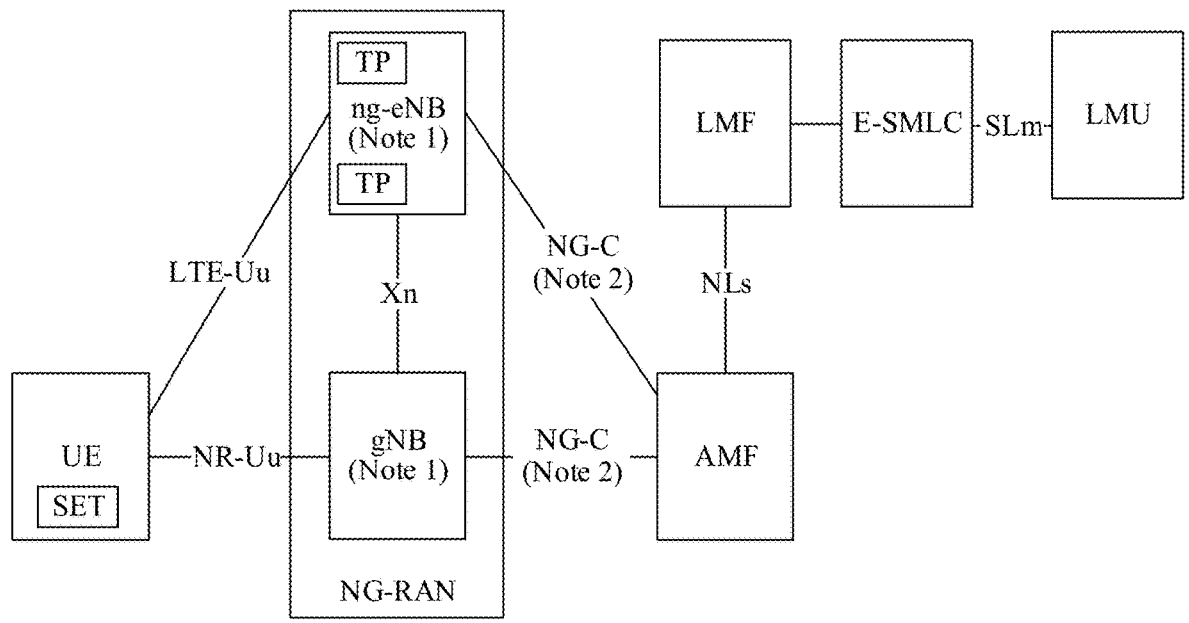

An example in which the terminal device is UE is used in both FIG. 1 and FIG. 2.

2. Network device: The network device may be a device configured to communicate with the terminal device. The network device may be an evolved NodeB (eNB or eNodeB) in an LTE system, a base transceiver station (BTS) in a global system for mobile communications (GSM) or a code division multiple access (CDMA) system, or may be a NodeB (NB) in a wideband code division multiple access (WCDMA) system, or may be a radio controller in a scenario of a cloud radio access network (CRAN). Alternatively, the network device may be a relay node, an access point, a vehicle-mounted device, a wearable device, a network device in a future 5G network, a network device in a future evolved PLMN network, or the like. This is not limited in the embodiments of this application.

3. Mobility management entity (MME): The MME may be configured to manage location information, security, and service continuity of the terminal device.

4. Location measurement unit (LMU) network element: The LMU network element may be integrated into the network device such as a base station, or may be separated from the base station, and receives an uplink signal sent by the terminal device. In the embodiments of this application, it is assumed that the LMU has a capability of sending a downlink signal.

5. Evolved serving mobile location center (E-SMLC) network element: The E-SMLC network element may be used for positioning, for example, referred to as a location service center, a location center, or a location management device. In the embodiments of this application, both the MME and the LMU are referred to as a location management device. The E-SMLC network element is configured to: collect measurement information and location information that are reported by the base station and the terminal device, and perform a location calculation by using a measurement result from the base station or terminal device, to determine a location of the terminal device.

In this architecture, the terminal device may be connected to a radio access network via the eNodeB through an LTE-Uu interface. The E-SMLC is connected to the LMU through an SLm interface, and the E-SMLC is connected to the MME through an SLs interface.

FIG. 2 is another schematic diagram of an architecture 200 applicable to an embodiment of this application. As shown in the figure, the architecture 200 may specifically include the following network elements:

1. Location management function (LMF) network element: The LMF network element may be used for positioning, for example, referred to as a location service center, a location center, or a location management device, which is referred to as a location management device in the embodiments of this application, and is configured to: collect measurement information and location information that are reported by the base station and the terminal device, and perform a location calculation by using a measurement result from the base station or terminal device, to determine a location of the terminal device. The LMF may be an apparatus or a component deployed in a core network to provide a positioning function for the terminal device.

2. Access and mobility management function (AMF) entity: The AMF entity is mainly used for mobility management, access management, and the like, and may be configured to implement a function other than session management in functions of a mobility management entity (MME), for example, functions such as lawful interception or access authorization (or authentication). In the embodiments of this application, the AMF entity may be configured to implement functions of an access and mobility management network element.

For other network elements, refer to the descriptions of the foregoing architecture 100. Details are not described herein again.

In the architecture 200, UE is connected to a next-generation radio access network (NG-RAN) via a next-generation base station (next-generation eNodeB, ng-eNB) and a gNB respectively through an LTE-Uu interface and/or an NR-Uu interface. The radio access network is connected to a core network via the AMF through an NG-C interface. The next-generation radio access network (NG-RAN) includes one or more ng-eNBs. The NG-RAN may alternatively include one or more gNBs. The NG-RAN may alternatively include one or more ng-eNBs and gNBs. The ng-eNB is an LTE base station that accesses a 5G core network, and the gNB is a 5G base station that accesses the 5G core network. The core network includes functions such as the AMF and LMF. The AMF and LMF are connected through an NLs interface.

Alternatively, the eNodeB in FIG. 1 and the ng-eNB in FIG. 2 may be replaced with transmission points (TP) (TP shown in FIG. 1 and FIG. 2).

In the embodiments of this application, the location management device is mentioned for a plurality of times. The location management device indicates a network element that can manage a serving cell and a neighboring cell. The location management device may be a part of the core network, or may be integrated into an access network device. For example, the location management device may be the LMF in the core network shown in FIG. 2, or may be the MME and the LMU shown in the figure. The location management device may also be referred to as a location center. A name of the location management device is not limited in this application. In a future evolved technology, the location management device may have another name.

It should be understood that the foregoing network architecture applied to the embodiments of this application is merely an example for description, and a network architecture applicable to the embodiments of this application is not limited thereto. Any network architecture that can implement the functions of the foregoing network elements is applicable to the embodiments of this application. For example, the embodiments of this application may be applied to another location system.

It should be further understood that the "network element" may also be referred to as an entity, a device, an apparatus, a module, or the like. This is not particularly limited in this application. In addition, in this application, for ease of understanding and description, the description of the "network element" is omitted in some descriptions. For example, the LMF network element is briefly referred to as an LMF. In this case, the "LMF" should be understood as an LMF network element or an LMF entity. Same or similar cases are not described below.

It should be further understood that names of interfaces between the foregoing network elements are only examples, and the interfaces may have other names in a specific implementation. This is not specifically limited in this application. In addition, names of messages (or signaling) transmitted between the foregoing network elements are merely examples, and do not constitute any limitation on functions of the messages.

It should be further understood that the foregoing names are merely used to distinguish between different functions, and shall not constitute any limitation on this application. This application does not exclude a possibility of using another name in a 5G network and another future network. For example, in a 6G network, terms in 5G may still be used for some or all of the foregoing network elements, or other names may be used. Uniform descriptions are provided herein, and details are not described below again.

For ease of understanding the embodiments of this application, the following first describes some terms used in the embodiments of this application.

1. Beam

The beam in an NR protocol may be embodied as a spatial domain filter that is also referred to as a spatial filter or a spatial parameter. A beam used to send a signal may be referred to as a transmit beam (Tx beam), or may be referred to as a spatial domain transmit filter or a spatial transmit parameter. A beam used to receive a signal may be referred to as a receive beam (Rx beam), or may be referred to as a spatial domain receive filter or a spatial receive parameter.

The transmit beam may refer to distribution of signal strength formed in different directions in space after a signal is transmitted by using an antenna, and the receive beam may refer to distribution of signal strength, in different directions in space, of a radio signal received from an antenna.

In addition, the beam may be a wide beam, a narrow beam, or a beam of another type. A technology for forming the beam may be a beamforming technology or another technology. The beamforming technology may be specifically a digital beamforming technology, an analog beamforming technology, a hybrid digital/analog beamforming technology, or the like The beam is usually corresponding to a resource. For example, during beam measurement, the network device measures different beams by using different resources, the terminal device feeds back measured resource quality, and the network device knows quality of a corresponding beam. During data transmission, beam information is also indicated by using a resource corresponding to the beam information. For example, the network device indicates information about a PDSCH beam of the terminal device by using a TCI resource in DCI.

Optionally, a plurality of beams whose communication features are the same or similar may be considered as one beam.

One beam may include one or more antenna ports, configured to transmit a data channel, a control channel, a sounding signal, and the like. The one or more antenna ports forming the beam may also be considered as one antenna port set.

2. Uplink Signal/Downlink Signal

According to the long term evolution LTE protocol or the NR protocol, at a physical layer, uplink communication includes transmission of an uplink physical channel and uplink signal.

The uplink physical channel includes a random access channel (PRACH), an uplink control channel (physical uplink control channel, PUCCH), an uplink data channel (physical uplink shared channel, PUSCH), and the like. The uplink signal includes but is not limited to: a sounding reference signal (SRS), an uplink control channel demodulation reference signal (PUCCH de-modulation reference signal, PUCCH-DMRS), an uplink data channel demodulation reference signal (PUSCH de-modulation reference signal, PUSCH-DMRS), an uplink phase noise tracking reference signal (PTRS), an uplink positioning signal (uplink positioning RS), and the like. Downlink communication includes transmission of a downlink physical channel and downlink signal.

The downlink physical channel includes a broadcast channel (physical broadcast channel, PBCH), a downlink control channel (physical downlink control channel, PDCCH), a downlink data channel (physical downlink shared channel, PDSCH), and the like. The downlink signal includes but is not limited to a primary synchronization signal (PSS), a secondary synchronization signal (SSS), a downlink control channel demodulation reference signal (PDCCH de-modulation reference signal, PDCCH-DMRS), a downlink data channel demodulation reference signal (PDSCH de-modulation reference signal, PDSCH-DMRS), a downlink phase noise tracking signal, a channel state information reference signal (CSI-RS), a cell reference signal (CRS), a fine synchronization signal (time/frequency tracking reference signal, TRS), a positioning signal (positioning RS), a UE-specific reference signal (US-RS), a synchronization signal/physical broadcast channel block (SS/PBCH block), and the like. The SS/PBCH block may be referred to as a synchronization signal block (SSB).

3. Resource

The resource may be an uplink signal resource, or may be a downlink signal resource. For the uplink signal and the downlink signal, refer to the foregoing descriptions.

The resource may be configured by using radio resource control (RRC) signaling.

In a configuration structure, one resource is one data structure, including a related parameter of an uplink/downlink signal corresponding to the resource, for example, a type of the uplink/downlink signal, a resource element that carries the uplink/downlink signal, transmit time and periodicity of the uplink/downlink signal, and a quantity of ports used to send the uplink/downlink signal.

A resource of each uplink/downlink signal has a unique identifier, to identify the resource of the uplink/downlink signal.

It may be understood that the identifier of the resource may also be referred to as an index of the resource. This is not limited in the embodiments of this application.

4. Cell

Cell: The cell is described by a higher layer from a perspective of resource management, mobility management, or a service unit. A coverage of each network device may be divided into one or more cells, and the cell may be considered to include a frequency domain resource. The cell may be an area within a coverage area of a wireless network of the network device. In the embodiments of this application, different cells may be corresponding to different network devices.

In the embodiments of this application, the cell may be replaced by a base station corresponding to the cell.

For example, "serving cell" is mentioned for a plurality of times in the embodiments of this application, and "serving cell" may be replaced by a network device corresponding to the serving cell, for example, "serving cell" is replaced by "serving base station".

For another example, in the embodiments of this application, "neighboring cell" is mentioned for a plurality of times. The neighboring cell may also be referred to as a non-serving cell. "Neighboring cell" may be replaced by a network device corresponding to the neighboring cell. For example, "neighboring cell" is replaced by "neighboring base station".

5. Downlink Timing

The network device may configure the terminal device to send or receive signals on some time-frequency resources, for example, slots, subframes, frames, or symbols. To determine specific time for sending or receiving the signals, the terminal device needs to perform timing synchronization by using a downlink signal, to determine a timing and align the timing with a time boundary of the network device. A downlink reference signal (for example, an SSB, a CSI-RS, or a CRS) may usually be used for timing synchronization, and the reference signal used for timing synchronization may be referred to as a timing anchor.

A downlink timing anchor may also be used to determine an uplink transmission timing. After determining a boundary of a downlink subframe by using a downlink timing signal, the terminal device may send the uplink signal according to a same timing reference coordinate. To implement uplink receiving alignment at a receive end, the network device may configure a timing advance (TA) for each terminal device, and the terminal device sends, on a basis of downlink timing synchronization, an uplink signal in advance based on the timing advance. In this way, time when the uplink signal sent by the terminal device arrives at the network device may be aligned with the uplink receive timing of the network device.

6. TA Adjustment for Uplink Transmission

The network device may configure a plurality of timing advance groups (TAG) for the terminal device by using higher layer signaling, where each TAG is corresponding to an ID (for example, denoted as a TAG-ID) and a time alignment timer. The network device can associate a TAG-ID with each cell. The network device initially assigns a value to $N_{TA}$ of each TAG by using an initial access response, where $N_{TA}$ indicates a quantized timing advance parameter.

The network device may further adjust a TA of each TAG by using signaling (for example, a MAC-CE message or DCI). A TA adjustment value may be an absolute adjustment value, that is, a current adjustment value directly replaces an existing value. Alternatively, the TA adjustment value may be a relative adjustment value, that is, the adjustment value is a value increased or decreased based on an existing TA value. It is assumed that after the terminal device receives, in a slot n, a MAC-CE message for adjusting the TA by the network device, the terminal device may apply the adjusted TA in a slot n+k, where n and k are integers greater than or equal to 0.

The terminal device may calculate, by using $N_{TA}$ configured by the network device, a timing advance of an uplink subframe i corresponding to $N_{TA}$ relative to a synchronized downlink subframe i, and a calculation formula may be:

$$T_{TA}=(N_{TA}+N_{TA,offset})T_C,$$

where $T_{TA}$ indicates a TA when the terminal device sends an SRS;

$N_{TA}$ indicates a quantized TA configured by the network device;

$T_C$ indicates a time unit, where for example, in a current protocol, $T_C=1/(\Delta f_{max}*N_f)$, $\Delta f_{max}=480.103$ Hz, and $N_f=4096$; and $N_{TA,offset}$ indicates a quantity related to a frequency band, and may be specified by the network device by using higher layer signaling or may be determined by using signal strength, time of arrival, and the like of downlink measurement performed by the terminal device after the network device specify some ranges. Table 1 shows a possible value of $N_{TA,offset}$.

TABLE 1

| Frequency range and band of cell used for uplink transmission | $N_{TA, offset}$ (unit: Tc) |
| --- | --- |
| Low frequency band (FR1) FDD band without LTE-NR coexistence case, or Low frequency band (FR1) TDD band without LTE-NR coexistence case | 25600 |
| Low frequency band (FR1) FDD band with LTE-NR coexistence case (FR1 FDD band with LTE-NR coexistence case) | 0 |
| Low frequency band (FR1) TDD band with LTE-NR coexistence case (FR1 TDD band with LTE-NR coexistence case) | 39936 |
| High frequency band (FR2) | 13792 |

FR1 and FR2 in Table 1 indicate spectrum ranges (FR). In a 3rd generation partnership project (3GPP) protocol, an overall spectrum resource of 5G may be divided into the following two spectrum ranges (FR), as shown in Table 2.

TABLE 2

| Frequency range name | Frequency range |
| --- | --- |
| FR1 | 750 MHz to 6000 MHz |
| FR2 | 24250 MHz to 52600 MHz |

It should be understood that naming of the foregoing frequency ranges FR1 and FR2 should not constitute any limitation on this application. This application does not exclude a possibility that another name is defined in a future protocol to represent a same or similar meaning. For distinction, FR1 and FR2 are respectively used in the following embodiments.

FR1 is a sub-6 GHz frequency band, namely, a low frequency band, and is a primary frequency band of 5G. In FR1, a frequency below 3 GHz may be referred to as sub 3G, and a remaining frequency band may be referred to as C-band. It should be understood that a frequency range corresponding to FR1 may be corresponding to 750 MHz to 6000 MHz shown in Table 2, but is not limited thereto. This application does not exclude a possibility that another range is defined in a future protocol to represent a same or similar meaning.

FR2 is a millimeter wave above 6 GHz, namely, a high frequency band, is an extended frequency band of 5G, and has abundant spectrum resources. It should be understood that a frequency range corresponding to FR2 may be corresponding to 24250 MHz to 52600 MHz shown in Table 2, but is not limited thereto. This application does not exclude a possibility that another range is defined in a future protocol to represent a same or similar meaning.

Figure 3:
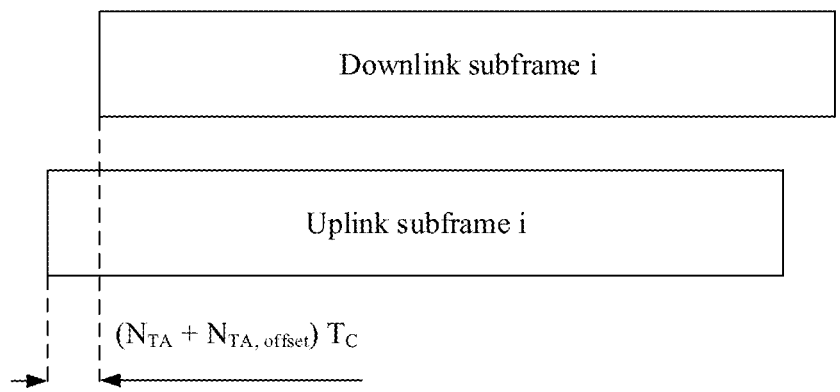
FIG. 3 is a schematic diagram of an uplink timing advance.

The terminal device may send an uplink signal based on a calculated timing advance, as shown in FIG. 3.

7. Uplink Time Difference of Arrival (UTDOA)-Based Positioning

During UTDOA positioning, the terminal device sends an uplink reference signal to a neighboring cell or a location measurement unit (LMU). The neighboring cell or LMU measures the received uplink reference signal, for example, records time of arrival of the uplink reference signal (or a time difference between the time of arrival of the uplink reference signal and an absolute moment), and summarizes measurement results to the location management device (such as the LMF). The location management device locates the terminal device based on information such as a measurement result and a cell location.

8. Round-Trip Time (RTT)

RTT indicates a sum of time from sending of a signal by a transmit end to receiving of a signal by a receive end (or may be understood as a propagation delay), and time from returning of a message by the receive end to receiving of the returned message by the transmit end. The RTT may be further used to determine a distance between the receive end and the transmit end, for example, denoted as D, that is, $D=RTT/2*c$, where c is the speed of light.

Figure 4:
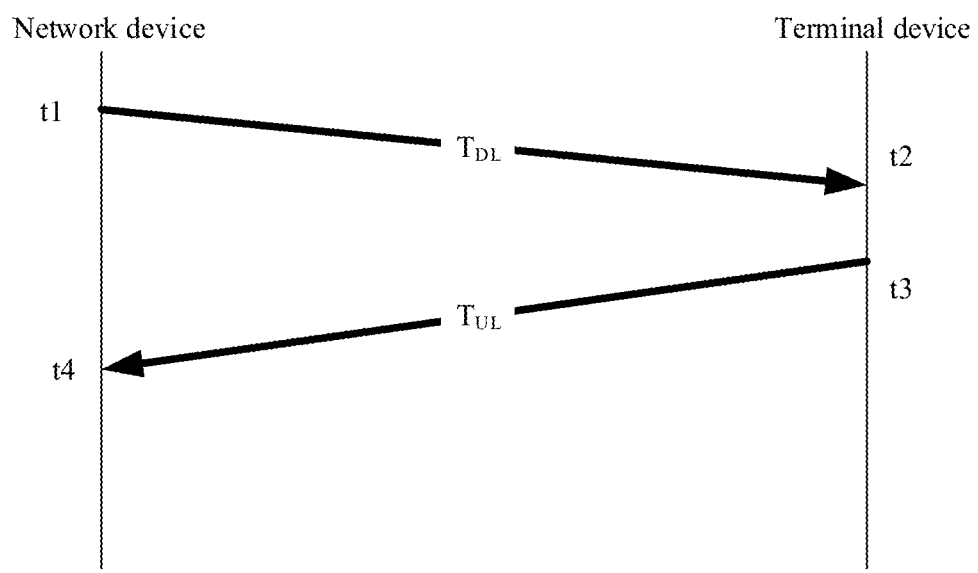
FIG. 4 is a schematic diagram of an RTT.

Processing delays of the transmit end and receive end are not considered. The RTT may be equal to twice the propagation delay between the transmit end and the receive end. As shown in FIG. 4, $RTT=(T_{DL}+T_{UL})$.

$T_{DL}$ indicates time from sending of a signal by the network device to receiving of the signal by the terminal device, and $T_{UL}$ indicates time from sending of a backhaul message by the terminal device to receiving of the backhaul message by the network device.

Figure 5:
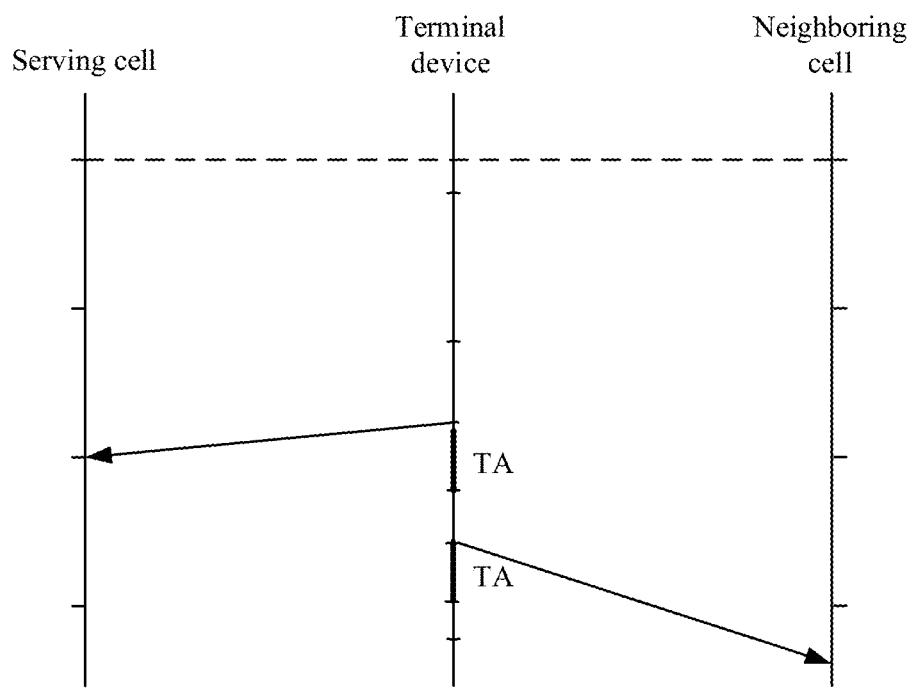
FIG. 5 is a schematic diagram of transmission of an uplink signal to a serving cell and a neighboring cell by a terminal device.

As shown in FIG. 5, in an existing solution, regardless of UTDOA positioning or RTT measurement, when sending an uplink signal to a serving cell and a neighboring cell, the terminal device sends the uplink signal based on an uplink TA of the serving cell. Consequently, time of arrival of the uplink signal sent by the terminal device may not be aligned with an uplink receive timing of the neighboring cell.

Because the time is not aligned with the uplink receive timing, the uplink signal sent by the terminal device may cause interference to the neighboring cell or another terminal device that sends an uplink signal to the neighboring cell.

In view of this, this application provides a communication method, so that a terminal device can send an uplink signal to a neighboring cell based on an uplink TA of a neighboring cell. In this case, the uplink signal sent by the terminal device is aligned with an uplink receive timing of the neighboring cell, thereby reducing interference to the neighboring cell caused by the uplink signal sent by the terminal device to the neighboring cell, and improving performance of communication between the terminal device and the neighboring cell.

To facilitate understanding the embodiments of this application, the following descriptions are provided.

First, in the embodiments of this application, a higher layer parameter is used widely, and the higher layer parameter may be included in higher layer signaling. The higher layer signaling may be, for example, a radio resource control (RRC) message, or may be other higher layer signaling. This is not limited in this application.

Second, in the embodiments of this application, "indication" may include a direct indication and an indirect indication, or may include an explicit indication and an implicit indication. Information indicated by one piece of information (for example, configuration information described below) is referred to as to-be-indicated information. In a specific implementation process, the to-be-indicated information may be indicated in a plurality of manners, for example, but not limited to, a manner of directly indicating the to-be-indicated information. For example, the to-be-indicated information is indicated by using the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already learned of or pre-agreed on. For example, the to-be-indicated information may be indicated by pre-agreeing on (for example, stipulating in a protocol) whether there is an information element, to reduce indication overheads to some extent.

Third, "first", "second", "third", "fourth", and various sequence numbers in the following embodiments are merely used for differentiation for ease of description, and are not used to limit the scope of the embodiments of this application, for example, distinguish between different measurement objects.

Fourth, in the embodiments shown below, "pre-obtain" may include being indicated by the network device by using signaling or being predefined, for example, defined in a protocol. "Predefinition" may be implemented in a manner in which corresponding code, a table, or other related indication information may be prestored in a device (for example, including a terminal device and a network device). A specific implementation of "predefinition" is not limited in this application.

Fifth, "protocol" in the embodiments of this application may be a standard protocol in the communication field, for example, may include an LTE protocol, an NR protocol, and a related protocol applied to a future communication system. This is not limited in this application.

Sixth, "and/or" describes an association relationship between associated objects and represents that three relationships may exist. For example, A and/or B may represent the following three cases: Only A exists, both A and B exist, and only B exists. The character "/" usually represents an "or" relationship between the associated objects. The term "a plurality of" means two or more, and another quantifier is similar to this. In addition, an element that appears in singular forms "a", "an", and "the" does not mean "one or only one" unless otherwise specified in the context, but means "one or more". For example, "a device" means one or more such devices. Further, "at least one . . . " means one or any combination of subsequent associated objects. For example, "at least one of A, B, and C" includes A, B, C, AB, AC, BC, or ABC.

The following describes in detail various embodiments provided in this application with reference to the accompanying drawings.

Figure 6:
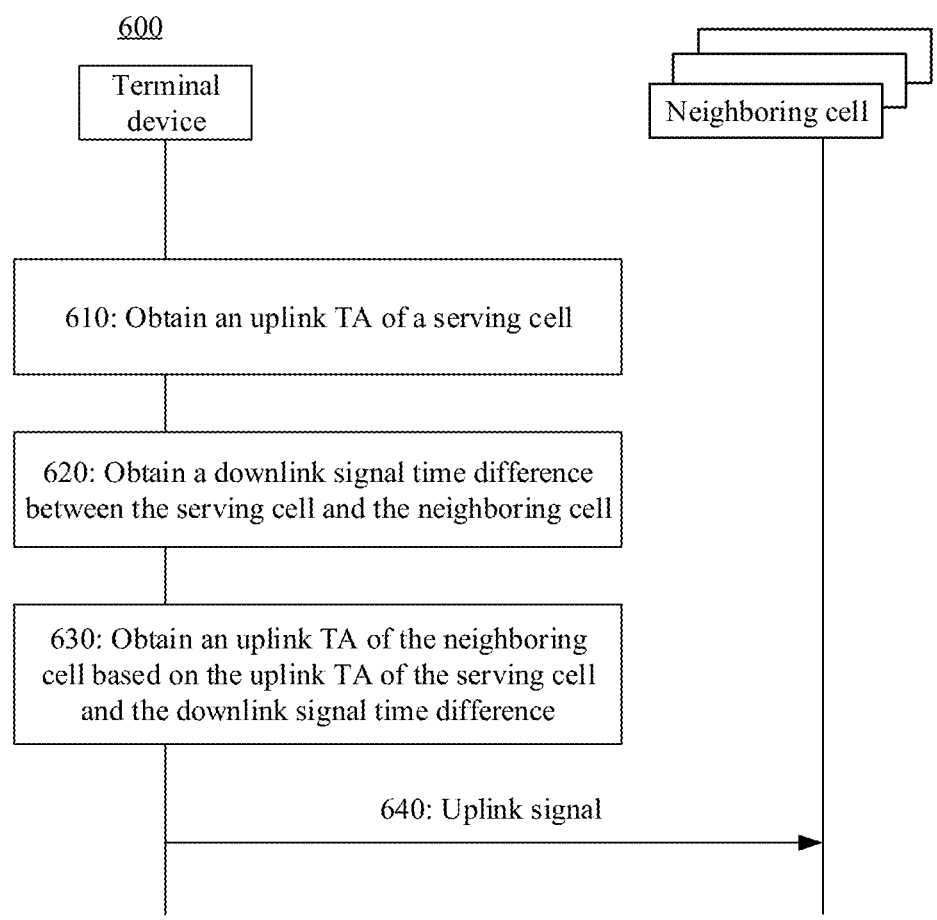
FIG. 6 is a schematic interaction diagram of a communication method according to an embodiment of this application.

FIG. 6 is a schematic flowchart of a communication method 600 according to an embodiment of this application. The method 600 includes the following steps.

610: A terminal device obtains an uplink TA of a serving cell.

The serving cell may also be understood as a network device corresponding to the serving cell, for example, a serving base station. The serving cell is uniformly used in the following descriptions. It should be understood that, as described above, "serving cell" in the embodiments of this application may be replaced by "serving base station".

The uplink TA of the serving cell may also be referred to as a reference time, a reference uplink time, or a reference TA (for example, a TA of a target cell for uplink transmission by the terminal device). In other words, that a terminal device obtains an uplink TA of a serving cell may also be understood as that the terminal device obtains a reference time or a reference TA.

It should be understood that the naming of the uplink TA of the serving cell, the uplink TA of the serving base station, the reference time, the reference uplink time, or the reference TA is merely a name, and does not limit the protection scope of this application. This application does not exclude a possibility that another name is defined in a future protocol to represent a same or similar meaning. The uplink TA of the serving cell is used in the following embodiments.

It should be further understood that the uplink TA of the serving cell in step 610 is different from a TA of a TAG configured by the network device. For differentiation, the uplink TA of the serving cell in step 610 is denoted as the uplink TA of the serving cell, and the TA of the TAG configured by the network device is recorded as a TA of the serving cell.

The uplink TA of the serving cell may be any one of the following: a TA of the serving cell, a cell-level Rx-Tx time difference, a reference signal Rx-Tx time difference, a time difference between sending of a signal by the terminal device and receiving of the signal by the serving cell, or a time difference between sending of a signal by the serving cell and receiving of the signal by the terminal device.

The following describes in detail a manner in which the terminal device obtains the uplink TA of the serving cell.

It should be understood that, in step 610, the terminal device may alternatively obtain an uplink TA of a neighboring cell. For example, the neighboring cell may be a target cell of uplink transmission performed by the terminal device. In this embodiment of this application, for ease of understanding, only the uplink TA of the serving cell is used as an example for description.

620: The terminal device obtains a downlink signal time difference between the serving cell and the neighboring cell.

The neighboring cell may also be referred to as a non-serving cell, may also be referred to as a neighboring cell, or may be understood as a network device corresponding to the neighboring cell, for example, a neighboring base station. The neighboring cell is uniformly used in the following descriptions. It should be understood that, as described above, "neighboring cell" in the embodiments of this application may be replaced by "neighboring base station".

The downlink signal time difference may also be referred to as a timing compensation value, referred to as timing compensation time, or referred to as uplink timing compensation time, or the like, and is used to indicate a time difference between the uplink TA of the serving cell and the uplink TA of the neighboring cell. In other words, the downlink signal time difference is used to indicate an uplink timing component that needs to be additionally compensated on the basis of the uplink TA of the serving cell when the terminal device sends an uplink signal to the neighboring cell.

It should be understood that names of the downlink signal time difference, the timing compensation value, the timing compensation time, or the uplink timing compensation time should not constitute any limitation on this application, and this application does not exclude a possibility that another name is defined in a future protocol to represent a same or similar meaning. The downlink signal time difference is used in the following embodiments.

The following describes in detail a specific form of the downlink signal time difference and a manner in which the terminal device obtains the downlink signal time difference.

It should be understood that downlink signals may be various reference signals, or may be downlink subframes, or the like. This is not limited. The downlink signal includes but is not limited to a CSI-RS, a CS-RS, a US-RS, a DMRS, and an SS/PBCH block. Without loss of generality, the downlink signal is uniformly used in the following descriptions.

630: The terminal device obtains the uplink TA of the neighboring cell based on the uplink TA of the serving cell and the downlink signal time difference.

Optionally, in some embodiments, the uplink TA of the neighboring cell is a sum of the uplink TA of the serving cell and the downlink signal time difference.

Figure 7:
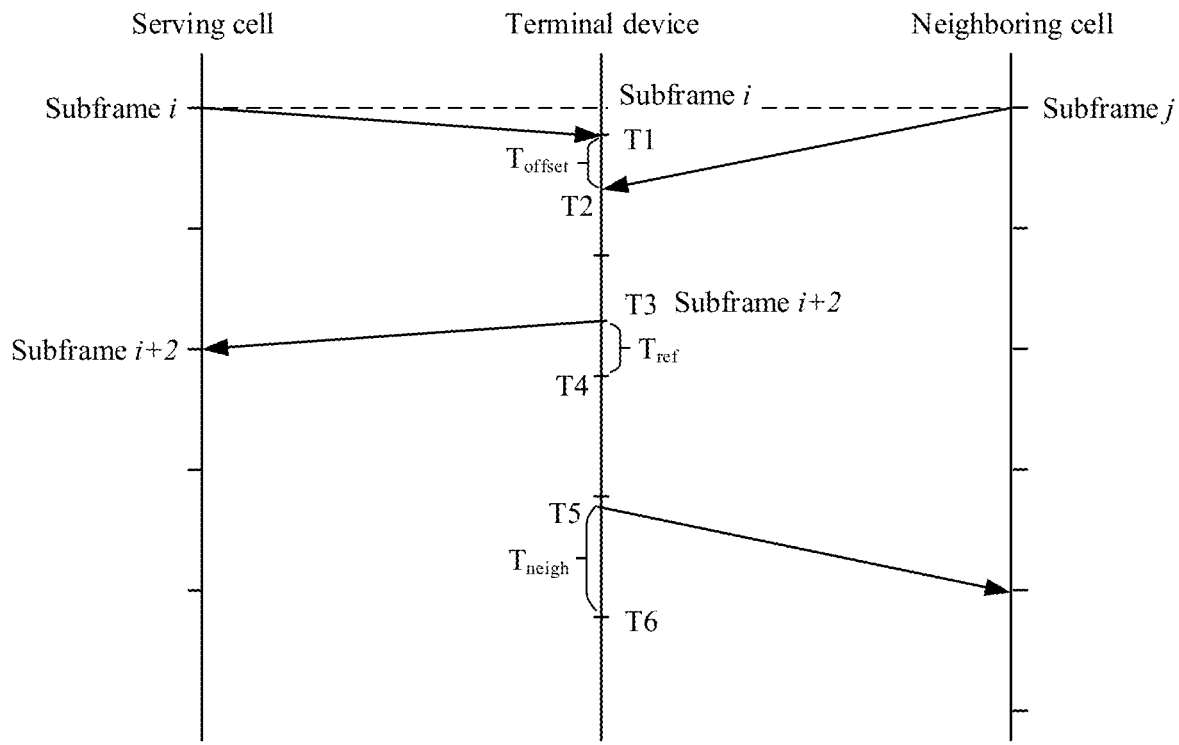
FIG. 7 to FIG. 12 are each a schematic diagram of a communication method applicable to an embodiment of this application.

For ease of understanding, FIG. 7 shows an example. As shown in FIG. 7:

The uplink TA of the serving cell may be the TA of the serving cell or the cell-level Rx-Tx time difference, for example, represented by $T_{ref}$. For example, $T_{ref}=T4-T3$.

The downlink signal time difference may be a time difference between receive time when the terminal device receives a downlink reference signal from the neighboring cell and receive time when the terminal device receives a downlink reference signal from the serving cell, for example, represented by $T_{offset}$. For example, $T_{offset}=T2-T1$.

The uplink TA of the neighboring cell may be $T_{offset}+T_{ref}=T2-T1+T4-T3$.

640: The terminal device sends an uplink signal based on the downlink subframe timing and the uplink TA of the neighboring cell.

The terminal device may send the uplink signal to one or more neighboring cells based on the downlink subframe timing and the uplink TA of the neighboring cell.

The uplink signal may be a reference signal, an SSB, an uplink subframe, or the like. This is not limited. For example, the uplink signal includes but is not limited to an SRS and a DMRS. In other words, the uplink signal in the following descriptions may be replaced with an SRS or a DMRS. Without loss of generality, the uplink signal is uniformly used in the following descriptions.

The downlink subframe timing may also be referred to as a downlink timing point, may be referred to as a downlink timing synchronization point, may be referred to as a downlink timing reference point, or may also be referred to as a frame timing reference, or the like. The downlink subframe timing may be used by the terminal device to determine, based on the uplink TA of the neighboring cell and the downlink subframe timing, time for sending the uplink signal. Naming of the downlink subframe timing should not constitute any limitation on this application. This application does not exclude a possibility that another name is defined in a future protocol to represent a same or similar meaning. The downlink subframe timing is used in the embodiments of this application.

The terminal device may determine the downlink subframe timing based on any one of the following: a downlink subframe timing of a primary cell, a downlink subframe timing of the serving cell, a downlink subframe timing determined based on a corresponding cell used to calculate the uplink TA of the neighboring cell, a downlink subframe timing determined based on a corresponding signal used to determine the uplink TA of the neighboring cell, a downlink subframe timing determined based on a specified cell (for example, specified by a location management device (such as an LMF) or the serving cell), a downlink subframe timing determined based on a specified reference signal (for example, specified by the location management device (such as the LMF) or the serving cell), a reference signal of the neighboring cell (for example, one or more reference signals specified by the location management device (such as the LMF)), or a downlink subframe timing of a specified cell.

Figure 8:
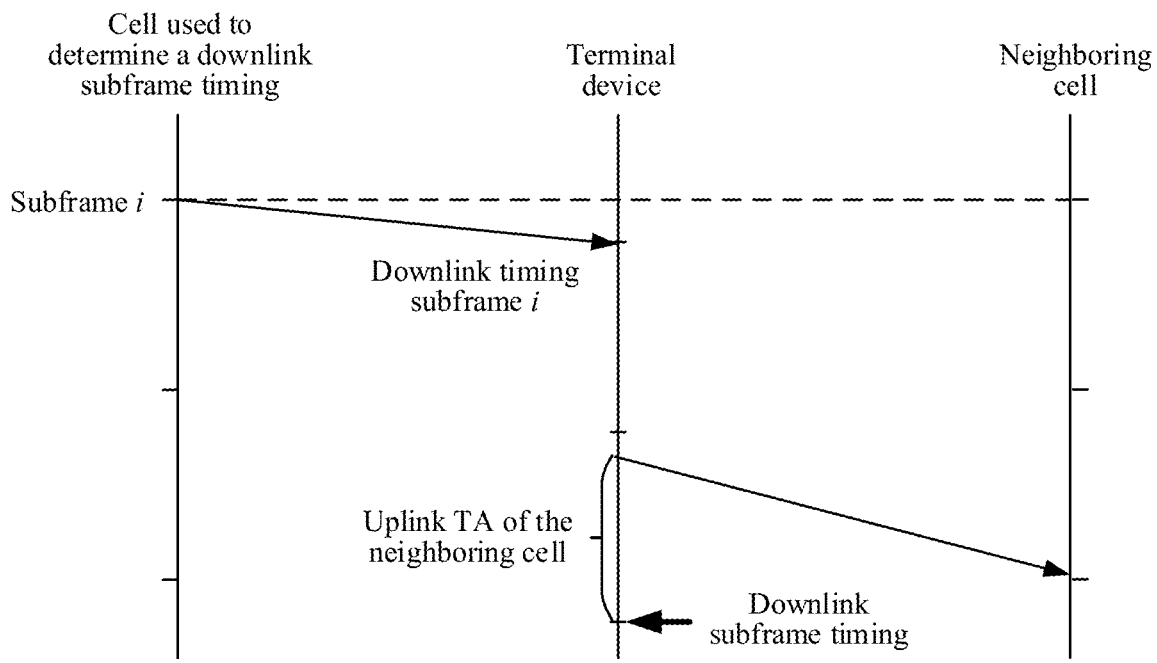

As shown in FIG. 8, the terminal device may determine the downlink subframe timing based on a cell used to determine the downlink subframe timing, namely, a downlink timing subframe i in FIG. 8, and determine, based on the uplink TA of the neighboring cell determined in step 630, time for sending the uplink signal to a neighboring cell A.

It should be understood that the cell used to determine the downlink subframe timing may be a serving cell, a corresponding cell used to calculate the uplink TA of the neighboring cell, a specified cell, a neighboring cell, or the like.

Optionally, in some embodiments, in step 640, the cell used to determine the downlink subframe timing (namely, the cell that is shown in FIG. 8 and that is used to determine the downlink subframe timing) may be a serving cell, for example, the serving cell in step 610. Alternatively, the cell used to determine the downlink subframe timing may be a cell that needs to be compensated, for example, the neighboring cell used to determine the downlink signal time difference in step 620. This is not limited. Examples are provided below for description with reference to FIG. 9 and FIG. 10.

For differentiation, the downlink signal time difference is denoted as TDOA, time of arrival of the downlink signal at the serving cell is denoted as $TOA_{serve}$, and time of arrival of the downlink signal at the neighboring cell is denoted as $TOA_{neigh}$. In a possible implementation, $TDOA=TOA_{neigh}-TOA_{serve}$.

The downlink subframe timing of the serving cell is used as a reference, and the uplink TA of the serving cell=$2*TOA_{serve}$, namely, twice an air interface delay. The uplink TA of the serving cell is denoted as TA1, that is, $TA1=2*TOA_{serve}$. The uplink TA of the neighboring cell includes the following cases.

Figure 9:
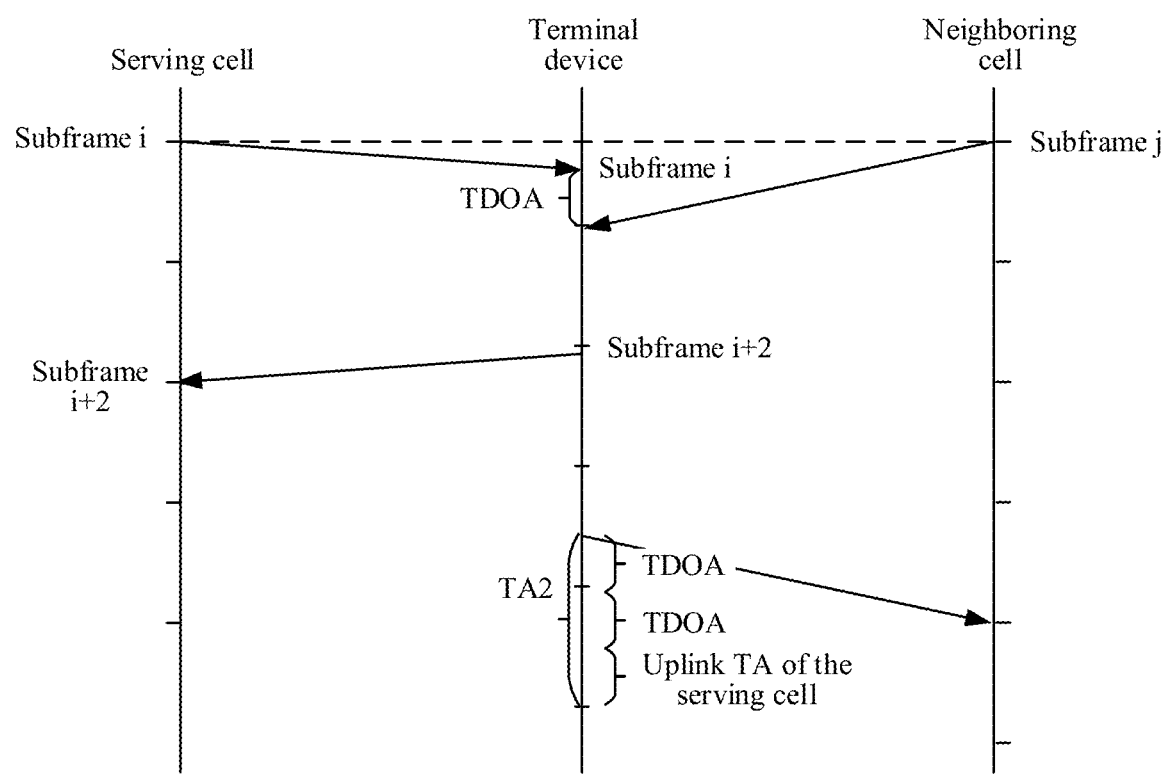

Case 1: The downlink subframe timing of the neighboring cell is used as a reference, as shown in FIG. 9. The TA of the neighboring cell=$2*TOA_{neigh}=2*(TOA_{serve}+TDOA)=TA1+2*TDOA$, that is, twice an air interface delay of the neighboring cell. In this case, the uplink TA of the neighboring cell is denoted as TA2, that is, TA2=TA1+2*TDOA.

Figure 10:
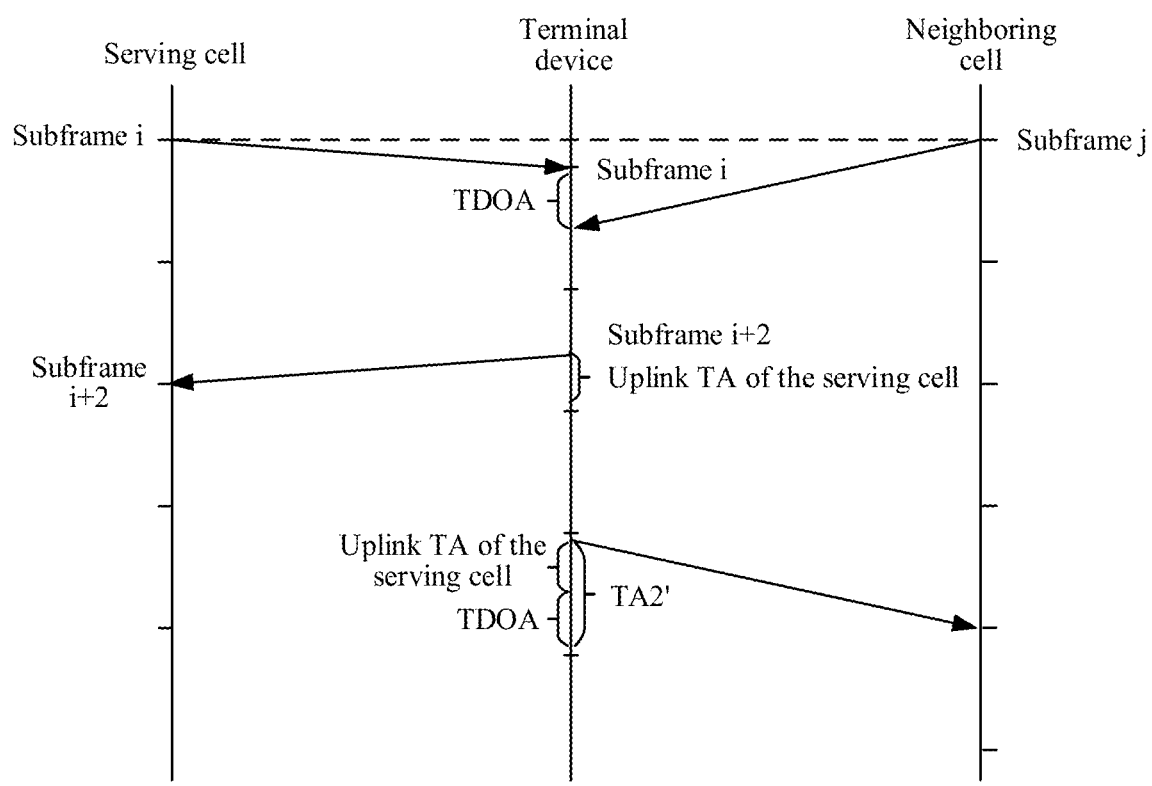

Case 2: The downlink subframe timing of the serving cell is used as a reference, as shown in FIG. 10. TA2 of the neighboring cell should compensate for the timing difference TDOA between the serving cell and the neighboring cell (where in other words, the TDOA is deducted from TA2), that is, the uplink TA of the neighboring cell=TA2−TDOA=2*TOA$_{serve}$+TDOA=TA1+TDOA. In this case, the uplink TA of the neighboring cell is denoted as TA2', that is, TA2'=TA1+TDOA.

Two cases in which the downlink subframe timing of the neighboring cell is used as a reference and the downlink subframe timing of the serving cell is used as a reference are described above by using examples. This application is not limited thereto. For example, as described above, the downlink subframe timing of the specified cell may also be used as a reference. Details are not described herein.

Optionally, in some embodiments, the terminal device may send the uplink signal to the neighboring cell based on the downlink subframe timing, the uplink TA of the neighboring cell determined in step 630, and a cell timing offset.

There may be a subframe timing offset between the serving cell and the neighboring cell. For differentiation, the subframe timing offset between the serving cell and the neighboring cell may be referred to as a timing offset of the cells or a cell timing offset, or may also be referred to as a base station subframe timing offset, or may also be referred to as a cell subframe timing offset. It should be understood that the cell timing offset, the cell subframe timing offset, the cell subframe timing offset, and the like are merely names. The names should not constitute any limitation on this application. This application does not exclude a possibility that another name is defined in a future protocol to represent a same or similar meaning. The cell timing offset is used in the following embodiments.

If there is a cell timing offset between the serving cell and the neighboring cell, the terminal device may obtain the cell timing offset of the two cells by using configuration information, and then determine an additional time offset by using the cell timing offset when sending a signal.

It should be understood that the cell timing offset indicates a time offset or synchronization offset when the cell sends a downlink subframe, and the cell timing offset is irrelevant to a propagation distance.

The terminal device can obtain the cell timing offset in any of the following manners.

Manner A: The location management device (for example, the LMF) or the like notifies the terminal device of initiation time of system frame numbers 0 (SFN 0) of two cells or a time difference between initialization of the SFNs 0. Correspondingly, the terminal device determines a cell timing offset based on the received signaling.

Manner B: The location management device (for example, the LMF) or the like notifies the terminal device of a cell timing offset between two cells by using signaling, for example, a subframe timing offset of a subframe.

The two cases shown in FIG. 9 and FIG. 10 are used as examples for description. The cell timing offset between the serving cell and the neighboring cell is denoted as D.

Figure 11:
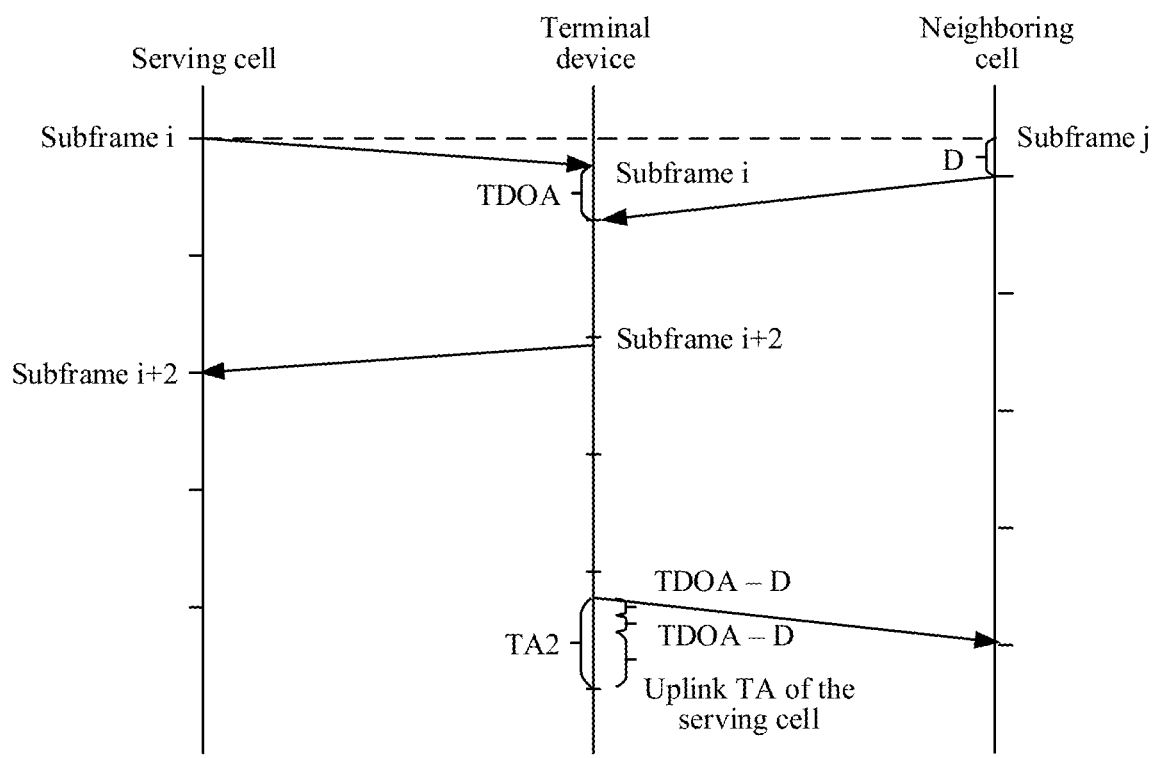

The case shown in FIG. 9 is used as an example, that is, the downlink subframe timing of the neighboring cell is used as a reference. As shown in FIG. 11, an uplink TA when the terminal device sends the uplink signal to the neighboring cell=uplink TA of the serving cell+2*TDOA−2*D.

The uplink TA of the serving cell is the uplink TA of the serving cell obtained by the terminal device in step 610.

Figure 12:
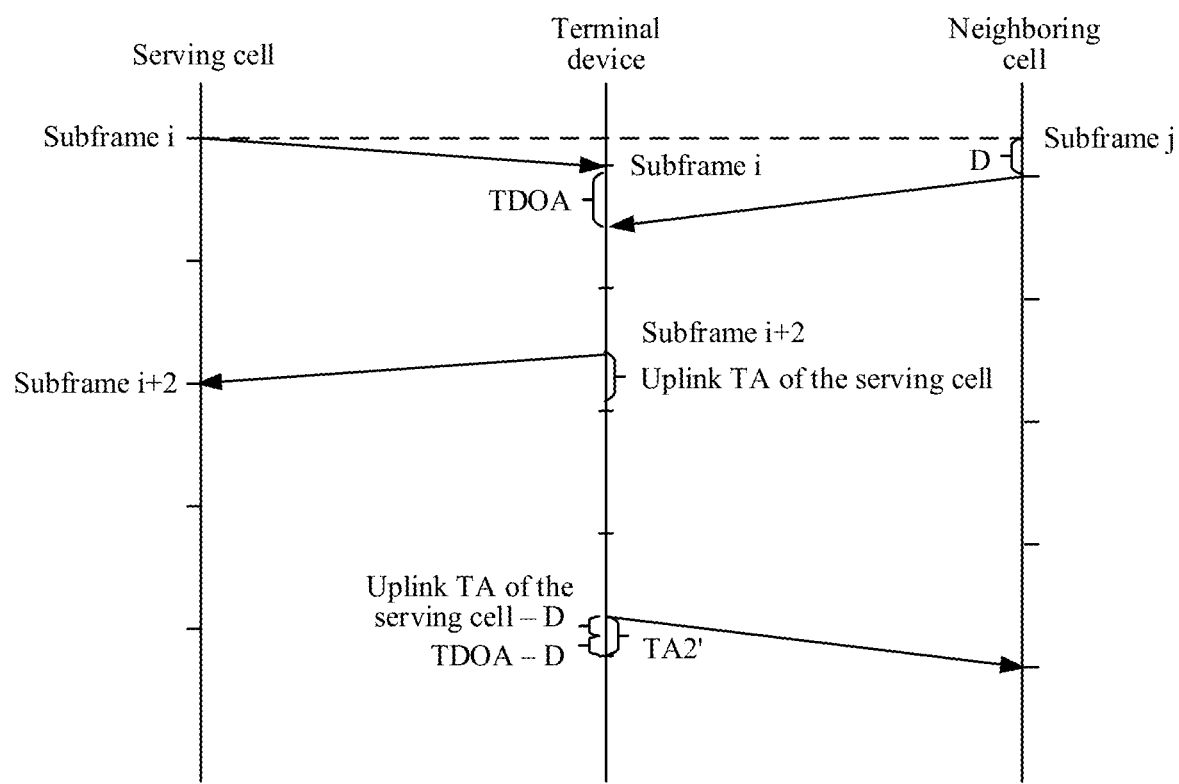

The case shown in FIG. 10 is used as an example, that is, the downlink subframe timing of the serving cell is used as a reference. As shown in FIG. 12, an uplink TA when the terminal device sends the uplink signal to the neighboring cell=uplink TA of the serving cell+TDOA−2*D.

The uplink TA of the serving cell is the uplink TA of the serving cell obtained by the terminal device in step 610.

The foregoing describes how the terminal device adjusts the uplink TA for sending the uplink signal to the neighboring cell when there is a cell timing offset between the serving cell and the neighboring cell.

Optionally, in some embodiments, the terminal device may alternatively adjust or process the uplink TA of the neighboring cell obtained in step 630.

To be specific, the uplink TA of the neighboring cell used by the terminal device in step 640 may be the same as or different from the uplink TA of the neighboring cell determined by the terminal device in step 630 based on the uplink TA of the serving cell and the downlink signal time difference. In other words, the terminal device may send the uplink signal based on the uplink TA of the neighboring cell determined in step 630, or the terminal device may first process the uplink TA of the neighboring cell determined in step 630, and then send the uplink signal based on the processed uplink TA.

For differentiation, the uplink TA of the neighboring cell determined by the terminal device in step 630 based on the uplink TA of the serving cell and the downlink signal time difference is denoted as a first uplink TA, and the uplink TA of the neighboring cell used by the terminal device in step 640 is denoted as a second uplink TA. The first uplink TA and the second uplink TA may be the same. Alternatively, the first uplink TA may be different from the second uplink TA. For example, the terminal device may process the first uplink TA to obtain the second uplink TA.

The terminal device may perform processing in at least one of the following manners.

Manner 1: The terminal device may perform modulo processing on the first uplink TA.

For example, second uplink TA=mod(first uplink TA, T0), where mod( ) indicates a modulo operation, for example, mod(5, 3)=2; and T0 may be a time unit granularity, where for example, T0 may be a subframe time length, for example, 1 ms; for another example, T0 may alternatively be a maximum TA value supported by a frequency band of the neighboring cell; for another example, T0 may alternatively be a maximum TA value specified in a protocol; f or another example, T0 may alternatively be a maximum TA value configured for the network device.

Manner 2: The terminal device may perform quantization processing on the first uplink TA.

For example, second uplink TA=Quantization(first uplink TA, T1), where Quantization( ) indicates a quantization operation; and T1 may be a time unit granularity, where for example, T1 may be a time unit $T_C$. For $T_C$, refer to the foregoing descriptions.

Manner 3: The terminal device may perform modulo and quantization processing on the first uplink TA.

The terminal device may perform both modulo processing and quantization processing on the first uplink TA. That is, the modulo processing and the quantization processing may be used together. For example, the terminal device may first perform modulo processing on the first uplink TA, and then quantize the TA after the modulo processing. For another example, the terminal device may first quantize the first uplink TA, and then perform modulo processing on the quantized TA.

Manner 4: The terminal device may first process the first uplink TA, and then perform modulo and/or quantization processing on the processed TA.

For example, the terminal device may first perform the following processing on the first uplink TA: first uplink TA−Tc*$N_{TA,offset}$, and then perform modulo and/or quantization processing on the processed TA. $N_{TA,offset}$ indicates an offset value, may be related to a frequency band, and may be specified by the network device by using higher layer signaling or may be determined by using signal strength, time of arrival, and the like of downlink measurement performed by the terminal device after the network device specify some ranges. For example, refer to the foregoing Table 1.

The foregoing describes several possible manners of processing the first uplink TA by using examples. This application is not limited thereto. For example, the terminal device may alternatively send the uplink signal based on the uplink TA of the neighboring cell obtained in step 630.

The following describes a manner in which the terminal device obtains the uplink TA of the serving cell in step 610.

The terminal device may obtain the uplink TA of the serving cell in any of the following manners.

Manner 1: The terminal device obtains the uplink TA of the serving cell by using a TAG.

Optionally, in some embodiments, the method 600 further includes: The network device delivers a TAG to the terminal device, where the TAG includes the TA of the serving cell. The terminal device obtains the TA of the serving cell based on the TAG, that is, the uplink TA of the serving cell is the TA of the serving cell.

For example, the network device may configure one or more TAGS for the terminal device by using higher layer signaling, and each TAG is corresponding to one ID, for example, denoted as a TAG-ID. The network device, such as a base station, initially assigns a value to an $N_{TA}$ of each TAG by using an initial access response, and adjusts the $N_{TA}$ of the TAG by using a MAC-CE message. The terminal device may obtain the uplink TA of the serving cell by using signaling delivered by the network device.

Manner 2: The terminal device determines the uplink TA of the serving cell based on a time difference between receive time when a downlink subframe i of the serving cell is received and transmit time when the terminal device sends an uplink subframe i to the serving cell, where i is an integer greater than 0 or equal to 0.

Optionally, in some embodiments, the uplink TA of the serving cell may be a cell-level Rx-Tx time difference, or the uplink TA of the serving cell may be a Rx-Tx time difference of the cell or a cell-based Rx-Tx time difference, for example, denoted as a UE Rx-Tx time difference. It should be understood that naming of the uplink TA of the serving cell does not constitute any limitation on this application.

When the uplink TA of the serving cell is a cell-level Rx-Tx time difference, Rx is an uplink frame timing of the serving cell, and Tx is a downlink frame timing associated with the serving cell. To be specific, the uplink TA of the serving cell may be a time difference between receive time when the terminal device receives a downlink subframe i of the serving cell and transmit time when the terminal device sends an uplink subframe i to the serving cell.

Manner 3: The terminal device determines the uplink TA of the serving cell based on a time difference between a receive timing that is of a downlink subframe j and that is determined by reception of a downlink signal of the serving cell and a transmit timing that is of an uplink subframe j and that is determined by transmission of an uplink signal to the serving cell by the terminal device, where j is an integer greater than or equal to 0.

Optionally, in some embodiments, the uplink TA of the serving cell may be a reference signal-level Rx-Tx time difference, or the uplink TA of the serving cell may be a Rx-Tx time difference of a reference signal or a reference signal-based Rx-Tx time difference, for example, denoted as a UE Rx-Tx time difference (RS level). It should be understood that naming of the uplink TA of the serving cell does not constitute any limitation on this application.

When the uplink TA of the serving cell is a reference signal-level Rx-Tx time difference, Rx is an uplink frame timing of the reference signal, and Tx is a downlink frame timing associated with the reference signal. To be specific, the uplink TA of the serving cell may be a time difference between a receive timing that is of a downlink subframe j and that is determined by reception of a reference signal by the terminal device and a transmit timing that is of an uplink subframe j and that is determined by transmission of another reference signal by the terminal device.

Manner 4: The terminal device determines the uplink TA of the serving cell based on a time difference between receive time when a downlink subframe k of the serving cell is received and a transmit timing that is of an uplink subframe k and that is determined by transmission of an uplink signal to the serving cell by the terminal device, where k is an integer greater than 0 or equal to 0.

Optionally, in some embodiments, the uplink TA of the serving cell may be a time difference between a cell-level Rx-Tx timing and a reference signal-level Rx-Tx timing. It should be understood that naming of the uplink TA of the serving cell does not constitute any limitation on this application.

When the uplink TA of the serving cell is a time difference between a cell-level Rx-Tx timing and a reference signal-level Rx-Tx timing, Rx may be an uplink frame timing of the serving cell, and Tx may be a downlink frame timing associated with the reference signal of the serving cell. To be specific, the uplink TA of the serving cell may be a time difference between receive time when the terminal device receives a downlink subframe k of the serving cell and a transmit timing that is of an uplink subframe k and that is determined by transmission of a reference signal to the serving cell by the terminal device.

Manner 5: The terminal device determines the uplink TA of the serving cell based on a time difference between a receive timing that is of a downlink subframe k and that is determined by reception of a downlink signal and transmit time when an uplink subframe k is sent to the serving cell.

Optionally, in some embodiments, the uplink TA of the serving cell may be a time difference between a cell-level Rx-Tx timing and a reference signal-level Rx-Tx timing. It should be understood that naming of the uplink TA of the serving cell does not constitute any limitation on this application.

When the uplink TA of the serving cell is a time difference between a cell-level Rx-Tx timing and a reference signal-level Rx-Tx timing, Rx may be an uplink frame timing of the reference signal of the serving cell, and Tx may be a downlink frame timing associated with the serving cell. To be specific, the uplink TA of the serving cell may be a time difference between a receive timing that is of a downlink subframe k and that is determined by reception of a reference signal from the serving cell by the terminal device and transmit time when the terminal device sends an uplink subframe k to the serving cell.

In any one of the foregoing manners, for the receive time when the terminal device receives the downlink subframe or the reference signal:

Optionally, in some embodiments, the terminal device may select time of arrival of a first path of receiving the signal as time of arrival of the downlink subframe or reference signal of the cell.

Alternatively, optionally, in some embodiments, the terminal device may select, in a receive beam sweeping manner, one with earliest receive time of a determined downlink subframe in a plurality of beams as a final receive beam for measurement.

It should be understood that the downlink subframe of the serving cell is used as an example for description. This application is not limited thereto. For example, the uplink TA of the serving cell may alternatively be determined by using a downlink subframe specified by the network device (for example, the serving cell or the location management device (for example, the LMF)) or based on a reference signal specified by the network device.

It should be further understood that the serving cell is used as an example for description. This application is not limited thereto. A cell based on which the uplink TA of the neighboring cell is determined, namely, a corresponding cell used by the terminal device to calculate the uplink TA of the neighboring cell, may be a serving cell, a cell specified by the network device (for example, the serving cell or the location management device (for example, the LMF)), a primary cell by default, or may be a neighboring cell (for example, a target cell for uplink transmission by the terminal device), or the like. This is not limited.

It should be further understood that the downlink signal of the serving cell is used as an example for description. This application is not limited thereto. A signal (for example, a reference signal) based on which the uplink TA of the neighboring cell is determined, namely, a corresponding signal (for example, a reference signal) used by the terminal device to calculate to the uplink TA of the neighboring cell, may be a signal (for example, a reference signal) delivered by the serving cell, a signal (for example, a reference signal) specified by the network device (for example, the serving cell or the location management device (for example, the LMF)), a synchronization signal/physical broadcast channel block selected by the terminal device of the primary cell for access by default, a downlink reference signal corresponding to an uplink transmission reference signal beam indication, a path loss, or a TA indication of the terminal device, or the like. This is not limited.

The foregoing describes a manner in which the terminal device obtains the uplink TA of the serving cell. The following describes a manner in which the terminal device obtains the downlink signal time difference in step 620.

As described above, the downlink signal time difference may also be referred to as a timing compensation value, and is used to indicate an uplink timing component that needs to be additionally compensated on the basis of the uplink TA of the serving cell when the terminal device sends the uplink signal to the neighboring cell.

A compensation reference source may be: a primary cell (PCell), the serving cell, the corresponding cell used to calculate the uplink TA of the neighboring cell, a corresponding signal used to calculate the uplink TA of the neighboring cell, a specified cell (for example, a cell specified by the network device (for example, the serving cell or the location management device (for example, the LMF))), a specified signal (for example, a reference signal specified by the network device (for example, the serving cell or the location management device (for example, the LMF))), or the like.

A compensation target may be a signal of a neighboring cell (for example, one or more reference signals specified by the network device (for example, the serving cell or the location management device (for example, the LMF))), a specified neighboring cell (selected by the terminal device if no specific reference signal is specified), another specified cell or signal, or the like.

The terminal device may obtain the downlink signal time difference by using any one of the following methods.

Method 1: The terminal device determines the downlink signal time difference based on a time difference between reference signals.

Optionally, in some embodiments, the downlink signal time difference may be a time difference between reference signals. A reference signal A and a reference signal B are used as an example, and the downlink signal time difference may be a time difference between a receive timing that is of a downlink subframe i and that is determined by reception of the reference signal A by the terminal device and a receive timing that is of a downlink subframe j and that is determined by reception of the reference signal B by the terminal device. The reference signal A and the reference signal B are from different cells.

Optionally, time of arrival of a subframe may be time of arrival of a starting point of the subframe (for example, a starting point of the first OFDM symbol). For example, the downlink signal time difference may be a time difference between a receive timing that is of a starting point of the downlink subframe i and that is determined by reception of the reference signal A by the terminal device and a receive timing that is of a starting point of the downlink subframe j and that is determined by reception of the reference signal B by the terminal device.

Optionally, the terminal device may select the time of arrival of a first path of receiving the signal as time of arrival of the reference signals A and B. For example, the downlink signal time difference may be a time difference between the time of arrival of the first path of receiving the reference signal A by the terminal device and the time of arrival of the first path of receiving the reference signal B by the terminal device.

Optionally, the terminal device may select, in a receive beam sweeping manner, one with earliest receive time of a determined downlink subframe in a plurality of beams as a final receive beam for measurement.

Optionally, subframe indexes i and j may be equal.

Optionally, a downlink subframe i that is determined by a reference signal A and whose starting point is closest to a starting point of a downlink subframe j determined by a reference signal B is selected to determine a time difference between receive time. For example, the downlink signal time difference may be a time difference between receive time of the starting point of the downlink subframe i determined by the reference signal A received by the terminal device and receive time of the downlink subframe j determined by the reference signal B received by the terminal device, where the starting point of the downlink subframe i determined by the reference signal A is closest to the starting point of the downlink subframe j determined by the reference signal B.

Method 2: The terminal device determines the downlink signal time difference based on a time difference between downlink timings.

Optionally, in some embodiments, the downlink signal time difference may be a difference between receive timings determined by reception of downlink reference signals from two cells by the terminal device.

The serving cell and the neighboring cell are used as an example. For example, the downlink signal time difference may be a time difference obtained by deducting a downlink timing of the neighboring cell from a downlink timing of the serving cell, or a time difference obtained by deducting the downlink timing of the serving cell from the downlink timing of the neighboring cell. For another example, the downlink signal time difference may be a time difference obtained by deducting a downlink subframe i of the neighboring cell from a downlink subframe j of the serving cell, or a time difference obtained by deducting the downlink subframe j of the serving cell from the downlink subframe i of the neighboring cell.

The network device (for example, the serving cell or the location management device (for example, the LMF)) may explicitly indicate a reference signal used for measuring a downlink receive timing, for example, a CSI-RS, a PRS, a TRS, or an SSB of the neighboring cell. Alternatively, the reference signal may be determined by the terminal device rather than being explicitly indicated by the network device, for example, an SSB accessed by the terminal device in the serving cell, or an SSB that is of the neighboring cell and that is selected by the terminal device based on signal quality of the SSB.

Optionally, time of arrival of a subframe may be time of arrival of a starting point of the subframe (for example, a starting point of the first OFDM symbol). For example, the downlink signal time difference may be a time difference between time of arrival of the starting point of the downlink subframe i of the neighboring cell and time of arrival of the starting point of the downlink subframe j of the serving cell.

Optionally, the terminal device may select the time of arrival of a first path of receiving the signal as time of arrival of the downlink subframe. For example, the downlink signal time difference may be a time difference between the time of arrival of the first path of receiving the reference signal by the terminal device from the serving cell and the time of arrival of the first path of receiving the reference signal by the terminal device from the neighboring cell.

Optionally, the terminal device may select, in a receive beam sweeping manner, one with earliest receive time of a determined downlink subframe in a plurality of beams as a final receive beam for measurement.

Optionally, subframe indexes i and j may be equal.

Optionally, a downlink subframe i that is determined by a reference signal A and whose starting point is closest to a starting point of a downlink subframe j determined by a reference signal B is selected to determine a time difference between receive time. For example, the downlink signal time difference may be a time difference between receive time of the starting point of the downlink subframe i determined by the reference signal A received by the terminal device from the serving cell and receive time of the downlink subframe j determined by the reference signal B received by the terminal device from the neighboring cell, where the starting point of the downlink subframe i determined by the reference signal A is closest to the starting point of the downlink subframe j determined by the reference signal B.

The foregoing describes a manner in which the terminal device obtains the uplink TA of the serving cell and the downlink signal time difference. The following describes a manner in which the terminal device obtains the uplink TA of the neighboring cell based on the uplink TA of the serving cell and the downlink signal time difference in step 630.

Based on different manners of obtaining the uplink TA of the serving cell in step 610 and different forms of the downlink signal time difference in step 620, the uplink TA of the neighboring cell may be obtained in any one of the following manners.

Manner 1: The uplink TA of the neighboring cell is: uplink TA of the serving cell+time of arrival of a starting point of a subframe i of a downlink reference signal of the neighboring cell−time of arrival of a starting point of a subframe i of a downlink reference signal of the serving cell.

Manner 2: The uplink TA of the neighboring cell is: uplink TA of the serving cell+time of arrival of a starting point of a subframe i of a downlink reference signal of the neighboring cell−time of arrival of a starting point of a subframe j of a downlink reference signal of the serving cell.

Manner 3: The uplink TA of the neighboring cell is: uplink TA of the serving cell+time of arrival of a starting point of a subframe i of a downlink reference signal of the neighboring cell−time of arrival of a starting point of a subframe j of a downlink reference signal of the serving cell. i and j may indicate subframes whose starting points are closest.

Manner 4: The uplink TA of the neighboring cell is: UE Rx-Tx time difference of the serving cell+time of arrival of a starting point of a subframe i of a downlink reference signal of the neighboring cell−time of arrival of a starting point of a subframe i of a downlink reference signal of the serving cell.

Manner 5: The uplink TA of the neighboring cell is: UE Rx-Tx time difference of the serving cell+time of arrival of a starting point of a subframe i of a downlink reference signal of the neighboring cell−time of arrival of a starting point of a subframe j of a downlink reference signal of the serving cell.

Manner 6: The uplink TA of the neighboring cell is: UE Rx-Tx time difference of the serving cell+time of arrival of a starting point of a subframe i of a downlink reference signal of the neighboring cell−time of arrival of a starting point of a subframe j of a downlink reference signal of the serving cell. i and j may indicate subframes whose starting points are closest.

Manner 7: The uplink TA of the neighboring cell is: UE Rx-Tx time difference (RS level)+time of arrival of a starting point of a subframe i of a downlink reference signal of the neighboring cell−time of arrival of a starting point of a subframe i of a downlink reference signal of the serving cell.

Manner 8: The uplink TA of the neighboring cell is: UE Rx-Tx time difference (RS level)+time of arrival of a starting point of a subframe i of a downlink reference signal of the neighboring cell−time of arrival of a starting point of a subframe j of a downlink reference signal of the serving cell.

Manner 9: The uplink TA of the neighboring cell is: UE Rx-Tx time difference (RS level)+time of arrival of a starting point of a subframe i of a downlink reference signal of the neighboring cell–time of arrival of a starting point of a subframe j of a downlink reference signal of the serving cell. i and j may indicate subframes whose starting points are closest.

Several manners of obtaining the uplink TA of the neighboring cell are described by using examples. It should be understood that this application is not limited thereto. For example, the uplink TA of the serving cell in the foregoing manners may be obtained by the terminal device in any one of the foregoing enumerated manners of obtaining the uplink TA of the serving cell, or may be replaced by the uplink TA of the neighboring cell, where the neighboring cell is the target cell for uplink transmission performed by the terminal device.

Optionally, the terminal device may alternatively determine an uplink timing of another cell by using the TA of the neighboring cell obtained in step 630. In this case, a downlink signal time difference between the neighboring cell and the another cell is added to the uplink timing of the another cell to obtain a TA of the another cell. Details are not described herein.

Optionally, in the foregoing embodiments, the terminal device may deduce the uplink TA of the neighboring cell based on the uplink TA of the serving cell and the downlink signal time difference. In some cases, the uplink signal sent by the terminal device may be received by a plurality of neighboring cells, or a neighboring cell whose uplink TA is used for sending the uplink signal by the terminal device is not determined. For example, in the following two cases, a neighboring cell whose uplink TA is used by the terminal device is not determined.

Case 1: Uplink transmission configured by the network device (for example, the serving cell or the location management device (for example, the LMF)) for the terminal device is not associated with a specific neighboring cell.

Case 2: Uplink transmission configured by the network device (for example, the serving cell or the location management device (for example, the LMF)) for the terminal device is associated with a plurality of neighboring cells.

When the uplink signal sent by the terminal device is possibly received by a plurality of neighboring cells, different neighboring cells may have different uplink TAs. Therefore, this embodiment of this application provides a plurality of selection manners, to determine a neighboring cell whose uplink TA is used by the terminal device to send the uplink signal.

Optionally, in some embodiments, an uplink signal planned to be sent or to be sent by the terminal device includes a downlink signal of the neighboring cell or is associated with an ID of the neighboring cell, which is used as a downlink signal source of spatial filtering, a path loss, or an explicit TA reference. In this case, for the uplink signal, the uplink TA of the neighboring cell is used.

In another possible implementation, an uplink signal planned to be sent or to be sent by the terminal device is associated with a plurality of neighboring cells or reference signals of a plurality of neighboring cells. In this case, the terminal device may determine, in any one of the following manners, a neighboring cell whose uplink TA is used.

Manner 1: The terminal device may directly configure a priority of each cell based on the network device (for example, the location management device (for example, the LMF)), for example, a sequence of a cell ID list is positively correlated or inversely correlated with the priorities, and determines a neighboring cell whose uplink TA is used. For example, an uplink TA of a cell with a highest priority may be used. For another example, an uplink TA of a cell with a lowest priority may be used.

Manner 2: The terminal device measures downlink reference signals of these cells, and selects, based on measurement results, for example, a cell with a highest RSRP or a cell with a lowest RSRP.

Manner 3: An uplink TA of a cell selected by the terminal device is closest to the uplink TA of the serving cell.

Based on the foregoing descriptions, in the solution provided by this application, the terminal device may determine, by obtaining the uplink TA of the serving cell and the downlink signal time difference, the uplink TA of the neighboring cell when sending the uplink signal to the neighboring cell, so that the terminal device can accurately and flexibly send the uplink signal to the neighboring cell. Performance and efficiency of communication between the terminal device and the neighboring cell are improved, and a problem that the uplink signal sent by the terminal device causes interference to the neighboring cell can be avoided.

The embodiments described in this specification may be independent solutions, or may be combined based on internal logic. All these solutions fall within the protection scope of this application.

Figure 13:
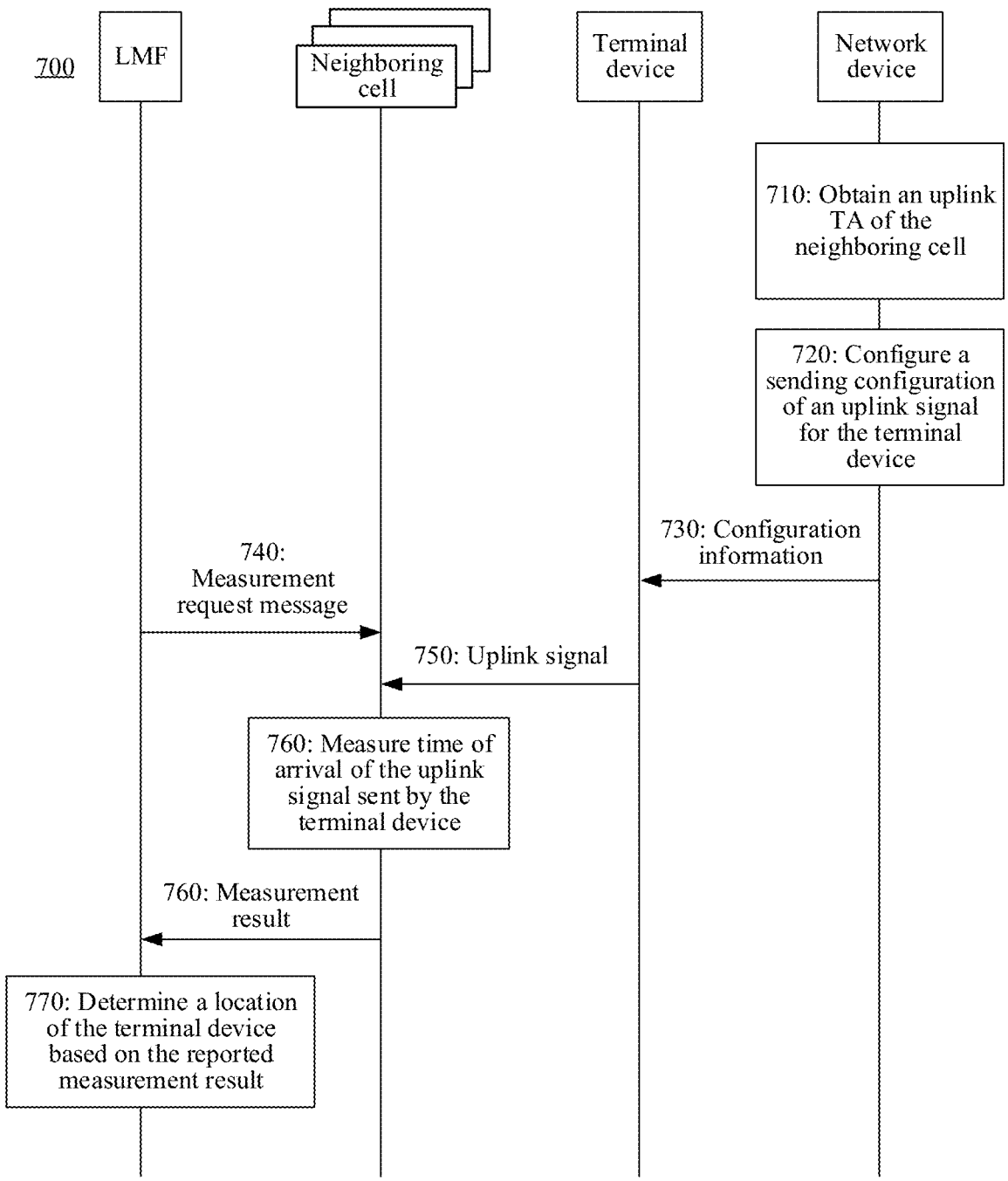
FIG. 13 is a schematic interaction diagram of a communication method according to still another embodiment of this application.

FIG. 13 is a schematic flowchart of a communication method 700 according to an embodiment of this application. The method 700 includes the following steps.

710: A network device obtains an uplink TA of a neighboring cell. In other words, the network device obtains the uplink TA for sending an uplink signal to the neighboring cell by the terminal device.

The neighboring cell may also be understood as a neighboring cell, that is, that the network device estimates the uplink TA for sending the uplink signal to the neighboring cell by the terminal device may also be understood as that the network device estimates the uplink TA for sending the uplink signal to the neighboring cell by the terminal device. The neighboring cell is uniformly used in the following descriptions. It should be understood that, "neighboring cell" in the embodiments of this application may be replaced by "neighboring base station".

For the uplink signal, refer to the descriptions in the method 600. Details are not described herein again. For example, each uplink signal in the following descriptions may be replaced with an SRS, and without loss of generality, the uplink signal is uniformly used in the following descriptions.

The network device may be a serving cell, or may be a location management device (for example, an LMF), or the like. The following describes in detail a manner in which the network device obtains the uplink TA of the neighboring cell.

After obtaining the uplink TA of the neighboring cell, the network device may configure a sending configuration of the uplink signal for the terminal device.

720: The network device configures the sending configuration of the uplink signal for the terminal device.

In other words, the network device may configure, for the terminal device, configuration information related to sending of the uplink signal. For example, the LMF or the serving cell configures, for the terminal device, the configuration information related to sending of the uplink signal.

For example, the uplink signal is an SRS, and the location management device is an LMF. Two possible configuration manners are described:

Configuration manner 1: The LMF configures the SRS (for example, through an LPP or NRPP protocol) for the terminal device.

Configuration manner 2: The serving cell configures the SRS for the terminal device.

The following describes the SRS configuration and the two configuration manners in detail.

Optionally, in some embodiments, the network device may configure a positioning-dedicated uplink reference signal for the terminal device, for example, an SRS set whose usage is set to positioning. The uplink reference signal or an uplink reference signal set may include the following features:

Feature 1: A signal of a neighboring cell (namely, a signal of a non-serving cell) may be used as a downlink reference signal or beam indicator for path loss calculation. For example, an SRS in the SRS set may use a CSI-RS or a PRS of a neighboring cell as a beam indication, and the terminal device needs to determine an uplink transmit beam of the SRS based on a downlink reference signal corresponding to the beam indication. In addition, an SRS in the SRS set may use a CSI-RS or a PRS of a neighboring cell as a power indication, and the terminal device needs to calculate a path loss based on a received power of a downlink reference signal corresponding to the power indication, to determine an uplink transmit power of the SRS.

Feature 2: A reference signal may be transmitted not according to an uplink timing of the serving cell. When the terminal device sends an SRS in the SRS reference signal set used for positioning, an uplink TA is different from an uplink TA of the serving cell. A specific uplink TA may be determined in a manner in this embodiment of this application. One resource set may share one uplink TA, or each resource may have an own TA. Similarly, one resource set may share one downlink timing reference signal (specified by the network device or determined in another manner), or each resource may have an own downlink timing reference signal.

Optionally, in some embodiments, the network device may further configure a plurality of TAs for a neighboring cell (for example, each neighboring cell), a resource, a resource set, or a neighboring cell set (for example, each neighboring cell set), and then specify a downlink signal resource. The terminal device measures the specified downlink signal resource, and determines, based on measurement results (for example, RSRPs and SINRs), a TA to be used. A specific mapping between the measurement results and the TAs may be configured by the location management device such as the LMF.

After configuring the sending configuration of the uplink signal for the terminal device, the network device sends the configuration information to the terminal device.

730: The network device sends the configuration information to the terminal device. Correspondingly, after receiving the configuration information, the terminal device may send the uplink signal based on the configuration information.

The configuration information includes TA-related information and some pieces of configuration information (for example, SRS configuration information) related to the uplink signal. The TA-related information includes the following two cases.

Case 1: The TA-related information may include an association relationship of the TA.

Optionally, in some embodiments, the network device may configure, by using configuration information (for example, NR positioning protocol (NRPP) signaling or RRC signaling), a TA corresponding to an uplink signal resource or uplink signal resource set for the terminal device. In other words, the network device may send the association relationship related to the TA to the terminal device (for example, by performing step 7214 shown in FIG. 15 or step 7223 shown in FIG. 16). Then, the terminal device determines, based on the association relationship of the TA, the uplink TA for sending the uplink signal.

Alternatively, optionally, in some embodiments, the association relationship of the TA may be preconfigured. For example, the association relationship of the TA may be pre-specified by the network device or in a protocol. The terminal device may prestore the association relationship of the TA.

The association relationship of the TA may be in any one of the following forms: One resource corresponds to one TA, a plurality of resources correspond to one TA, one resource set corresponds to one TA, a plurality of resource sets correspond to one TA, one neighboring cell ID or neighbor cell ID corresponds to one TA, or a plurality of neighboring cell IDs or neighbor cell IDs (or a neighboring cell ID set or neighbor cell ID set) correspond to one TA.

For descriptions of the resource, refer to the foregoing terminology descriptions. Details are not described herein again.

The terminal device may determine, based on the association relationship of the TA, for example, based on a resource identifier and the association relationship of the TA, an uplink TA for sending a corresponding uplink signal.

Case 2: The TA-related information may include the uplink TA for sending the uplink signal by the terminal device.

For example, optionally, in some embodiments, the network device may notify, by using signaling (for example, NRPP signaling or RRC signaling), the terminal device of the uplink TA for sending the uplink signal.

It should be understood that the foregoing case 1 and the foregoing case 2 may exist independently, or may coexist. This is not limited.

Optionally, in some embodiments, the network device sends IDs of cells to the terminal device, and the terminal device may determine, based on the IDs of cells, cells to which the uplink signal is to be sent (for example, an SRS is sent).

Optionally, in some embodiments, the configuration information may further include information about a downlink subframe timing. For a definition of the downlink subframe timing, refer to the descriptions in the method 600. Details are not described herein again.

To facilitate the neighboring cell to measure time of arrival of the uplink signal sent by the terminal device, the LMF may send a measurement request message to the neighboring cell.

740: The LMF sends the measurement request message to the neighboring cell.

The LMF may request, by using signaling (for example, NR positioning protocol A (NRPPa) signaling, an Slm interface through which the LMF interacts with an LMU, or an NR SLm interface (NR-SLm)), the serving cell, one or more neighboring cells, and another measurement-related entity to measure the uplink signal sent by the terminal device.

For example, the uplink signal is an SRS. The LMF may transfer the SRS configuration information in step 720 to the measurement-related entity. That is, the measurement request message may carry the SRS configuration information. In other words, the SRS configuration information may be notified to the terminal device by using the measurement request message sent by the LMF, thereby further reducing signaling overheads.

750: The terminal device sends the uplink signal to the neighboring cell.

After receiving the configuration information of the uplink signal, the terminal device may send the uplink signal to one or more neighboring cells. The terminal device may further send the uplink signal to the serving cell. For ease of understanding, FIG. 13 shows only that the terminal device sends the uplink signal to the neighboring cell.

The terminal device determines the uplink TA based on the received configuration information (for example, the SRS configuration), and sends the uplink signal based on the uplink TA and the downlink subframe timing.

The terminal device may determine the downlink subframe timing in any one of the following manners.

Manner 1: The terminal device determines the downlink subframe timing based on a downlink signal.

Manner 2: The terminal device determines the downlink subframe timing based on frame timing information.

The following describes in detail the foregoing two manners of determining the downlink subframe timing by the terminal device.

Figure 14:
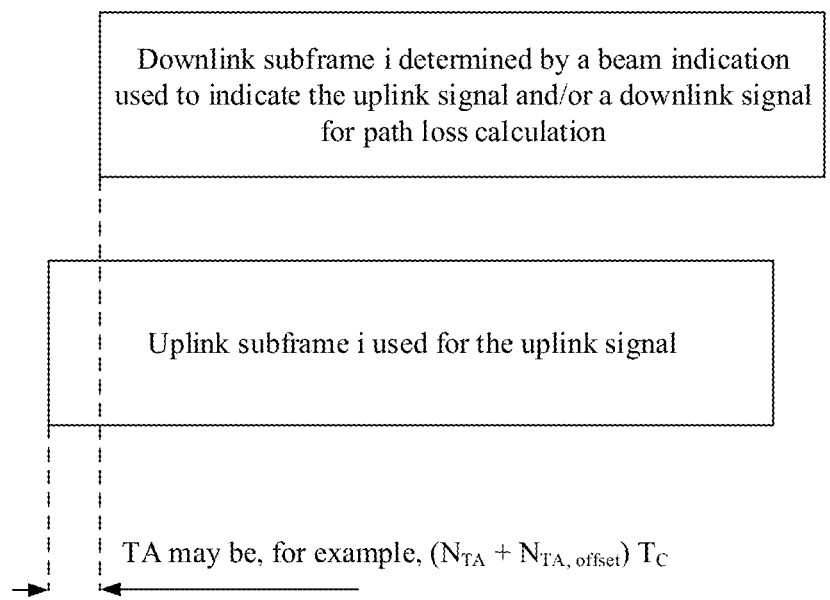
FIG. 14 is a schematic diagram of a communication method applicable to still another embodiment of this application.

Optionally, in some embodiments, timing information for sending the uplink signal by the terminal device may be determined based on a beam indication that is configured by the network device (for example, a base station or the LMF) and that is used to indicate the uplink signal, and/or the timing information for sending the uplink signal by the terminal device may be determined based on downlink timing information determined by a downlink signal for path loss calculation. As shown in FIG. 14, the uplink TA for sending the uplink signal may be, for example, $(N_{TA}+N_{TA,offset}) T_C$. TA indicates a TA when the terminal device sends the uplink signal; $N_{TA}$ indicates a TA configured by the serving cell or LMF; $T_C$ indicates a time unit, where for example, in an existing protocol, $T_C=1/(\Delta f_{max}*N_f)$, $\Delta f_{max}=480 \cdot 10^3$ Hz, and $N_f=4096$; and $N_{TA,offset}$ indicates a frequency band-related quantity, and may be specified by using higher layer signaling, where for example, Table 1 shows a possible value of $N_{TA,offset}$.

760: The neighboring cell measures time of arrival of the uplink signal sent by the terminal device, and reports a measurement result to the LMF.

In other words, the neighboring cell measures, based on the measurement request message sent by the LMF and the uplink signal sent by the terminal device, the time of arrival of the uplink signal sent by the terminal device, for example, records time of arrival of the uplink reference signal (where an absolute moment is alternatively used as a time difference of a reference point).

In step 760, the serving cell, the neighboring cell, and the another measurement-related entity each may measure time of arrival of the uplink signal sent by the terminal device, and report a measurement result to the LMF. For ease of understanding, FIG. 13 shows only that the neighboring cell measures the time of arrival of the uplink signal sent by the terminal device, and reports the measurement result to the LMF.

770: The LMF may determine a location of the terminal device based on the reported measurement result.

The LMF may determine the location of the terminal device based on the measurement results reported by the serving cell, the neighboring cell, and the another measurement-related entity. For example, the serving cell, the neighboring cell, and the another measurement-related entity record the time of arrival of the uplink signal (where an absolute moment is alternatively used as a time difference of a reference point), and then summarize the measurement results to the LMF. The LMF locates the terminal device based on information such as the measurement results and locations of the cells. A manner in which the LMF determines the location of the terminal device is not limited in this embodiment of this application. Any manner in which the LMF determines the location of the terminal device based on the reported measurement result falls within the protection scope of the embodiments of this application.

The following describes a manner in which the network device obtains the uplink TA of the neighboring cell in step 710.

The network device may obtain the uplink TA of the neighboring cell in any one of the following manners.

Manner 1: The network device obtains an initial location of the terminal device, and obtains the uplink TA of the neighboring cell based on the initial location of the terminal device. For example, the network device estimates the uplink TA of the neighboring cell based on a distance between the terminal device and the neighboring cell and a signal transmission speed.

The network device may be, for example, the serving cell or the LMF. That is, the serving cell or the LMF may obtain, based on the initial location of the terminal device, information about an uplink TA (for example, an uplink timing advance difference or an absolute uplink timing advance value) for sending the uplink signal to each neighboring cell, the LMU, and the like by the terminal device.

The network device may obtain the initial location of the terminal device or a rough transmission delay by using any of the following methods.

Method A: The terminal device or the network device obtains, through positioning, a location (for example, a previous location) of the terminal device or an initial location with relatively low precision.

For example, the terminal device positions itself by using a global positioning system (GPS), and then reports a GPS positioning result to the network device, so that the network device obtains the location of the terminal device based on the GPS positioning result reported by the terminal device.

For another example, the network device obtains a rough location of the terminal device in an enhanced cell identification (E-CID) manner.

Method B: The terminal device reports a beam measurement result of the neighboring cell to the LMF, and the LMF roughly determines a rough location of the terminal device based on the reported beam measurement result and with reference to a location of the neighboring cell, a beam space direction, and the like.

It should be understood that the foregoing two methods are merely examples for description. A method for obtaining the location of the terminal device is not limited in this embodiment of this application. Any method for obtaining the location of the terminal device falls within the protection scope of the embodiments of this application.

Manner 2: The terminal device sends a preamble to the neighboring cell, and the network device obtains the uplink TA of the neighboring cell. For example, the serving cell or the location management device may trigger the terminal device to send a random access signal to the neighboring cell. A random access procedure triggered by the serving cell or the location management device for the neighboring cell may be as follows.

(1) The network device (for example, the serving cell or the location management device) may send a random access resource request (for example, by using an NRPPa) to the neighboring cell, where the request message includes but is not limited to information such as a downlink reference signal (such as an SSB or a CSI-RS of the neighboring cell) of a neighboring cell corresponding to the random access resource, a length of a random access preamble, and a reference signal strength threshold. The neighboring cell may provide the random access resource (for example, by using an NRPPa) by sending a random access resource response to the network device. The response message includes but is not limited to a downlink reference signal that may be used for a random access request, a corresponding random access preamble, a random access opportunity, and the like.

(2) The network device configures the terminal device to send the random access preamble to the neighboring cell. The network device sends, to the terminal device by using signaling (for example, NRPP), a random access configuration of the neighboring cell, including the information such as the downlink reference signal (for example, the SSB or the CSI-RS of the neighboring cell) of the neighboring cell corresponding to the random access resource, the length of the random access preamble, and the reference signal strength threshold. The network device may configure an additional sending interval for the terminal device, and the terminal device may perform switching such as frequency switching and subcarrier spacing switching within the interval.

Optionally, in some embodiments, the location management device may request the serving cell to complete the random access configuration. For example, the location management device sends, to the serving cell, a request that the terminal device sends the random access preamble, and provides information about the foregoing random access configuration. Then, the serving cell configures the information to the terminal device by using RRC or the like, and triggers the terminal device to send the random access preamble (for example, by using a PDCCH order). Then, the serving cell may further send a response to the location management device, to notify that the random access preamble has been sent.

(3) The terminal device sends the random access preamble to the neighboring cell based on the configuration. After sending the preamble, the terminal device may send a response to the network device.

(4) The network device obtains the uplink TA of the neighboring cell from the neighboring cell.

Manner 3: The network device may determine the uplink TA of the neighboring cell by using the uplink TA of the serving cell and the downlink signal time difference in the method 600. For example, the terminal device may report the uplink TA of the serving cell and the downlink signal time difference to the network device, and the network device determines the uplink TA of the neighboring cell based on the uplink TA of the serving cell and the downlink signal time difference.

For the uplink TA of the serving cell and the downlink signal time difference in the manner 3, refer to the descriptions in the method 600. Details are not described herein again.

The network device may obtain the uplink TA of the neighboring cell in any one of the foregoing manners.

The following describes a manner in which the network device configures the sending configuration of the uplink signal for the terminal device in step 720.

An example in which the uplink signal is an SRS is used to describe the foregoing two possible configuration manners.

Configuration manner 1: The LMF configures the SRS (for example, through an LPP or NR-PP protocol) for the terminal device.

The serving cell (or a neighboring cell of uplink transmission performed by the terminal device) provides a resource configuration of the SRS, and the LMF configures the SRS (for example, by using the LPP or NR-PP protocol) for the terminal device. Optionally, configuration information such as an uplink TA, a downlink subframe timing, a power control reference signal, or a beam reference signal for sending the SRS may be included in the resource configuration of the SRS provided by the serving cell, or may be specified by the LMF.

Figure 15:
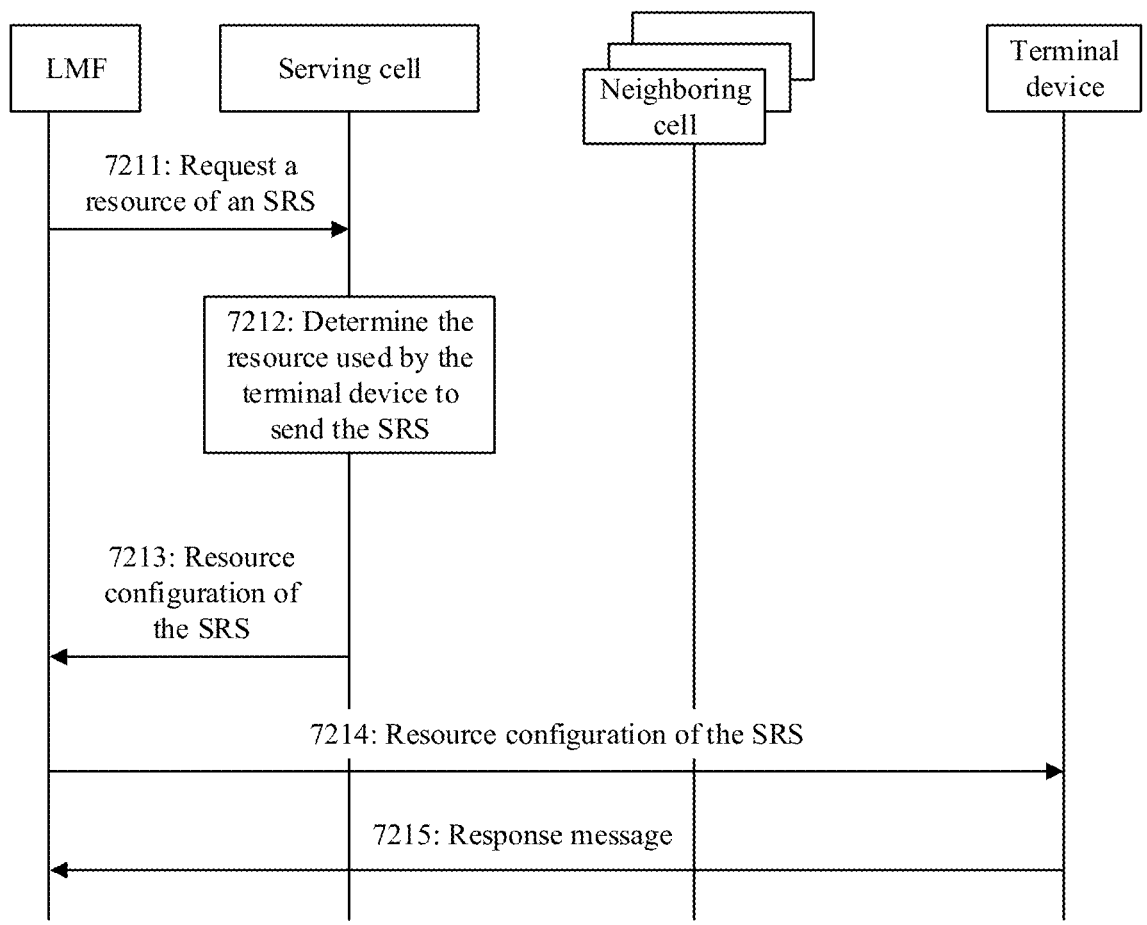
FIG. 15 and FIG. 16 are each a schematic diagram of a configuration method applicable to an another embodiment of this application.

The following describes the foregoing configuration manner 1 with reference to FIG. 15. FIG. 15 includes the following steps.

7211: The LMF requests a resource of the SRS from the serving cell.

The LMF may request the resource of the SRS from the serving cell, or the LMF may request the resource of the SRS from another cell, for example, a cell that provides reference data or a target cell of uplink transmission performed by the terminal device. For example, the LMF may request the resource of the SRS by using an NRPPa protocol.

The serving cell may determine a resource configuration of the SRS based on the request of the LMF.

7212: The serving cell determines the resource used by the terminal device to send the SRS.

The resource configuration of the SRS may include one or more of the following information: an identifier of the resource of the SRS, a quantity of ports of the resource of the SRS, a port number of a PT-RS associated with the resource of the SRS, comb configuration information and a sequence cyclic shift that are of the resource of the SRS, a start symbol index of the resource of the SRS, a quantity of consecutive symbols and a repetition factor that are of the resource of the SRS, an index of a start resource block RB of the resource of the SRS, frequency hopping configuration information of the resource of the SRS, a bandwidth of the SRS, sequence group hopping and sequence hopping that are of the resource of the SRS, a periodic configuration of the resource of the SRS, spatial filtering information of the resource of the SRS, or the like.

It should be understood that the resource configuration of the SRS is merely an example for description, and this application is not limited thereto. Any resource configuration of the SRS falls within the protection scope of this application.

It should be further understood that FIG. 15 shows only that the serving cell determines the resource used by the terminal device to send the SRS. This application is not limited thereto. For example, a neighboring cell (for example, a neighboring cell of uplink transmission performed by the terminal device) may determine the resource used by the terminal device to send the SRS.

After determining the resource configuration of the SRS, the serving cell may notify the LMF.

7213: The serving cell sends a response, and feeds back the resource configuration of the SRS to the LMF.

Optionally, in some embodiments, the serving cell may further notify the LMF of information about the neighboring cell and/or a TA associated with each uplink signal resource or each uplink signal resource set. For example, the information about the neighboring cell includes but is not limited to: a neighboring cell ID associated with an uplink signal, a downlink signal sent by the neighboring cell, or the uplink TA of the neighboring cell. The terminal device may send the SRS to the neighboring cell based on the information about the neighboring cell.

After receiving the resource configuration of the SRS fed back by the serving cell, the LMF may send the resource configuration of the SRS to the terminal device.

7214: The LMF sends the resource configuration of the SRS to the terminal device.

For example, the LMF may send the resource configuration of the SRS to the terminal device by using the NRPP protocol (for example, NRPP signaling). For information included in the resource configuration of the SRS, refer to step 7212.

The LMF may further configure, by using configuration information, TA-related information mentioned in step 730 for the terminal device.

After receiving the resource configuration of the SRS, the terminal device may send the SRS based on the resource configuration of the SRS. Alternatively, after receiving the resource configuration of the SRS, the terminal device may send a response to the LMF.

7215: The terminal device sends the response to determine whether the SRS can be sent based on the configuration by the LMF.

When the SRS configured by the LMF for the terminal device conflicts with other uplink transmission of the terminal device, the terminal device may ignore some reference signals and notify the LMF in the response. For example, when an SRS configured by the LMF for positioning conflicts with a PUCCH or PUSCH that needs to be sent by the terminal device, the terminal device may select not to send the SRS used for positioning.

It should be understood that step 7215 shows only a case in which the terminal device sends the response to the LMF, and this application is not limited thereto. For example, after receiving the resource configuration of the SRS, the terminal device may alternatively send the SRS directly based on the resource configuration of the SRS.

Configuration manner 2: The serving cell configures the SRS for the terminal device.

The serving cell (or a neighboring cell of uplink transmission performed by the terminal device) determines a resource configuration of the SRS (for example, the resource configuration of the SRS mentioned in step 7212 above), and the serving cell configures the SRS for the terminal device (possibly in a form of an SRS resource and an SRS resource set that are used for positioning).

Figure 16:
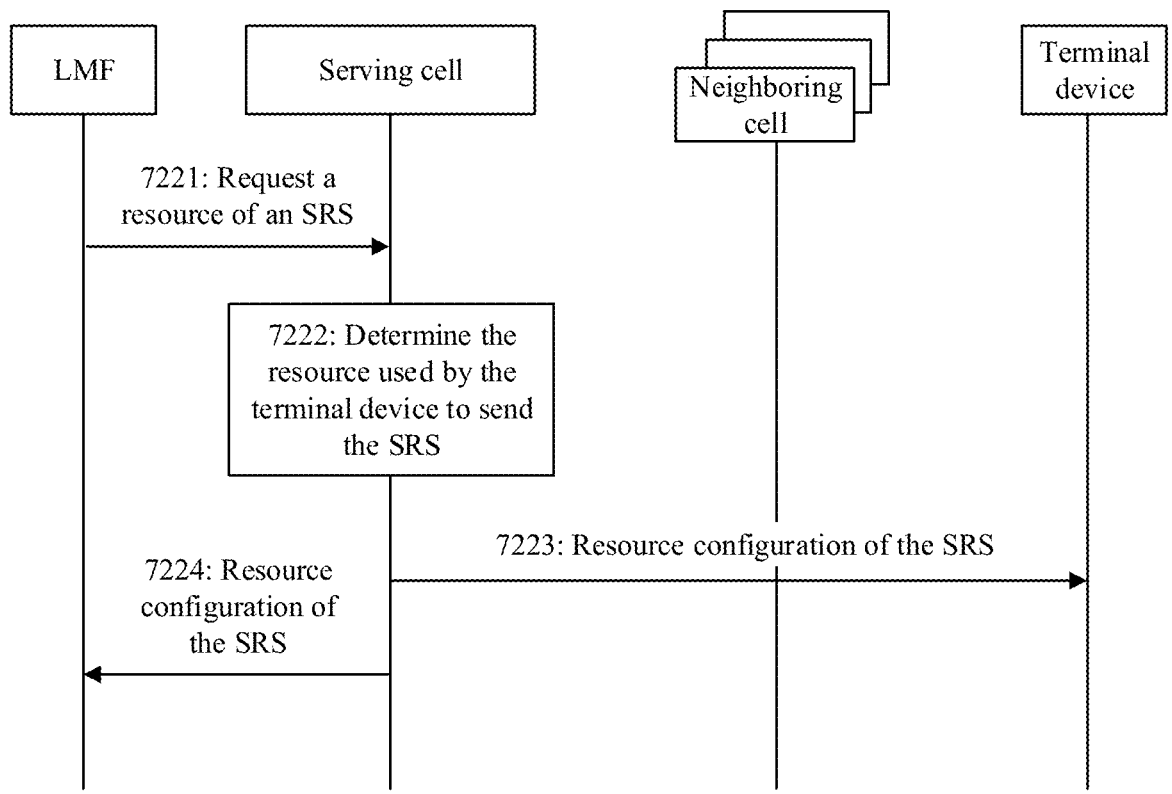

The following describes the foregoing configuration manner 2 with reference to FIG. 16. FIG. 16 includes the following steps.

7221: The LMF may request a resource of the SRS from the serving cell, or the LMF may request the resource of the SRS from another cell, for example, a cell that provides reference data or a target cell of uplink transmission performed by the terminal device. For example, the LMF may request the resource of the SRS by using an NRPPa protocol.

Optionally, in some embodiments, the LMF may provide the serving cell with related information of the neighboring cell, for example, the uplink TA of the neighboring cell, a downlink subframe timing, a power control reference signal, or a beam reference signal, to assist the serving cell in configuring the SRS.

The serving cell may determine a resource configuration of the SRS based on the request of the LMF.

7222: The serving cell determines a resource used by the terminal device to send the SRS.

For step 7222, refer to step 7212. Details are not described herein again.

7223: The serving cell allocates the resource of the SRS to the terminal device.

Optionally, in some embodiments, the resource configuration of the SRS may be configured for the terminal device in a form of an SRS resource and a resource set that are used for positioning. A beam indication of the SRS and a reference signal used for power calculation may be configured as reference signals of a non-serving cell, or may be configured as reference signals of the serving cell.

Optionally, in some embodiments, the LMF may notify the serving cell of a timing advance (for example, the uplink TA of the neighboring cell) for sending the SRS to the neighboring cell by the terminal device. For example, the LMF notifies the serving cell by using NRPP signaling. The serving cell may perform corresponding configuration based on the uplink TA.

After configuring the SRS, the serving cell reports the configuration of the SRS to the LMF, then the LMF distributes the configuration of the SRS to related cells and measurement units.

7224: The serving cell sends a response, and reports the resource configuration of the SRS to the LMF.

That is, the serving cell reports a related configuration in step 7223 to the LMF.

Optionally, in some embodiments, the serving cell may further notify the LMF of the association relationship of the TA mentioned in step 730 (for example, the TA associated with each uplink signal resource or each uplink signal resource set).

Optionally, in some embodiments, the serving cell may further notify the LMF of information about the neighboring cell. For example, the information about the neighboring cell includes but is not limited to: a neighboring cell ID associated with an uplink signal, a downlink signal sent by the neighboring cell, or the uplink TA of the neighboring cell. The terminal device may send the SRS to the neighboring cell based on the information about the neighboring cell.

It should be understood that there is no explicit limitation on a sequence of the foregoing steps. For example, there is no explicit limitation on a sequence of step 7223, step 7221, and step 7224. For example, the serving cell may first deliver the configuration of the SRS to the terminal device, and the LMF notifies the LMF of the configuration of the SRS when requesting the configuration of the SRS.

In the foregoing two configuration manners, an uplink TA configured by the serving cell or the LMF may be a quantized TA. For quantization, refer to the descriptions in the method 600. Details are not described herein again.

After receiving the uplink TA configured by the serving cell or the LMF, the terminal device may determine an offset based on a frequency band and then send the uplink TA. For example, the uplink TA for sending the uplink signal may be determined by using the following formula:

$$T_{TA} = (N_{TA} + N_{TA,offset}) T_C,$$

where $T_{TA}$ indicates a TA when the terminal device sends the SRS;

$N_{TA}$ indicates the TA configured by the serving cell or the LMF;

$T_C$ indicates a time unit, where for example, in an existing protocol, $T_C=1/(\Delta f_{max}*N_f)$, $\Delta f_{max}=480\cdot10^3$ Hz, and $N_f=4096$; and $N_{TA,offset}$ indicates a frequency band-related quantity, and may be specified by using higher layer signaling, where for example, the table 1 shows a possible value of $N_{TA,offset}$.

It should be understood that, in consideration of differences of coverage, the network device (for example, the base station or the location management device) may configure an offset table for each of the neighboring cell and the serving cell. The offset table used when the terminal device determines the TA of the neighboring cell may be different from the offset table used when determining the TA of the serving cell.

The foregoing describes the two configuration manners in detail with reference to FIG. 15 and FIG. 16. The following describes a manner in which the terminal device determines the downlink subframe timing in step 750.

The terminal device may determine the downlink subframe timing in any one of the following manners.

Manner 1: The terminal device determines the downlink subframe timing based on a downlink signal.

For the downlink signal, refer to the descriptions in the method 600. Details are not described herein again.

The network device may specify downlink signals/a downlink signal of a serving cell (for example, a PCell) and/or a neighboring cell as downlink subframe timings/a downlink subframe timing (which may also be referred to as, for example, a frame timing reference). In other words, the network device may notify the terminal device that the downlink signals/downlink signal of the serving cell and/or the neighboring cell are/is used as the downlink subframe timings/downlink subframe timing. The terminal device obtains the downlink subframe timing by determining a subframe boundary of a downlink signal (for example, a downlink reference signal). Uplink timing information may be determined by using the obtained downlink subframe timing. To be specific, the terminal device may determine, based on the downlink subframe timing, a timing for sending the uplink signal.

The network device may configure a corresponding downlink signal for a reference signal resource or reference signal resource set, so that the terminal device may obtain a downlink timing by using a subframe boundary of the downlink signal corresponding to the reference signal resource or reference signal resource set. Alternatively, the network device may associate a corresponding downlink signal for the neighboring cell, the LMU, or the like, so that the terminal device may obtain a downlink timing by using a subframe boundary of a downlink signal associated with the neighboring cell, the LMU, or the like.

Manner 2: The terminal device determines the downlink subframe timing based on frame timing information.

The network device may configure, for the terminal device, frame timing information for uplink sending, for example, configure subframe initialization time (SFN initialization time) for a cell, an uplink reference signal resource, or an uplink reference signal resource set. The network device may further configure a time difference relative to a timing of the serving cell or a reference cell, for example, a subframe initial time difference or a frame timing offset.

The terminal device determines the downlink subframe timing in any one of the foregoing manners, and then may send the uplink signal based on the determined downlink subframe timing and the uplink TA of the neighboring cell.

Based on the foregoing descriptions, in the solution provided by this application, the network device configures the uplink TA of the neighboring cell for the terminal device, and notifies the terminal device of the uplink TA of the neighboring cell, so that the terminal device can accurately and flexibly send the uplink signal to the neighboring cell. Performance and efficiency of communication between the terminal device and the neighboring cell are improved, and a problem that the uplink signal sent by the terminal device causes interference to the neighboring cell can be avoided.

The embodiments described in this specification may be independent solutions, or may be combined based on internal logic. All these solutions fall within the protection scope of this application.

It may be understood that in the foregoing method embodiments, the methods and operations that are implemented by the terminal device may alternatively be implemented by a component (for example, a chip or a circuit) that may be used in the terminal device, and the methods and the operations that are implemented by the network device may alternatively be implemented by a component (for example, a chip or a circuit) that may be used in the network device.

It should be understood that sequence numbers of the foregoing processes do not mean execution sequences in the foregoing method embodiments. The execution sequences of the processes should be determined based on functions and internal logic of the processes, and should not be construed as any limitation on the implementation processes of the embodiments of this application.

The foregoing describes the method embodiments provided in the embodiments of this application, and the following describes apparatus embodiments provided in the embodiments of this application. It should be understood that descriptions of the apparatus embodiments correspond to the descriptions of the method embodiments. Therefore, for content that is not described in detail, refer to the foregoing method embodiments. For brevity, details are not described herein again.

The foregoing mainly describes the solutions provided in the embodiments of this application from a perspective of interaction between the network elements. It may be understood that, to implement the foregoing functions, each network element, such as a transmit end device or a receive end device, includes a corresponding hardware structure and/or software module for performing each function. A person skilled in the art may be aware that with reference to units and algorithm steps in the examples described in the embodiments disclosed in this specification, this application can be implemented by electronic hardware or a combination of computer software and electronic hardware. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In the embodiments of this application, a transmit end device or a receive end device may be divided into function modules based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that module division in the embodiments of this application is an example, and is merely a logical function division. During actual implementation, another division manner may be used. An example in which each functional module is obtained through division based on a corresponding function is used below for description.

Figure 17:
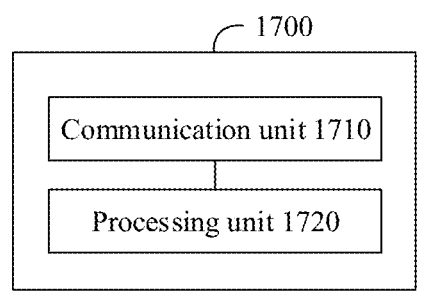
FIG. 17 is a schematic block diagram of a communication device according to an embodiment of this application.

FIG. 17 is a schematic block diagram of a communication device 1700 according to an embodiment of this application. The communication device 1700 includes a communication unit 1710 and a processing unit 1720.

In a possible design, the communication device 1700 may implement the steps or procedures performed by the terminal device in the foregoing method embodiments, for example, may be the terminal device, or a chip or circuit configured in the terminal device. The communication unit 1710 is configured to perform receiving/sending-related operations on the terminal device side in the foregoing method embodiments, and the processing unit 1720 is configured to perform processing-related operations on the terminal device in the foregoing method embodiments.

In this possible design, in a possible implementation, the processing unit 1720 is configured to: obtain an uplink timing advance TA of a serving cell; obtain a downlink signal time difference between the serving cell and at least one neighboring cell; and obtain an uplink TA of the at least one neighboring cell based on the uplink TA of the serving cell and the downlink signal time difference. The communication unit 1710 is configured to send an uplink signal to the at least one neighboring cell based on a downlink subframe timing and the uplink TA of the at least one neighboring cell.

Optionally, in some embodiments, the uplink TA of the neighboring cell is a sum of the uplink TA of the serving cell and the downlink signal time difference.

Optionally, in some embodiments, the communication unit 1710 is configured to receive a timing advance group TAG from a network device, where the TAG includes the uplink TA of the serving cell. The processing unit 1720 is configured to obtain the uplink TA of the serving cell from the TAG.

Optionally, in some embodiments, the uplink TA of the serving cell is: a time difference between receive time when the communication device 1700 receives a downlink subframe i of the serving cell and transmit time when the communication device 1700 sends an uplink subframe i to the serving cell, where i is an integer greater than or equal to 0.

Optionally, in some embodiments, the uplink TA of the serving cell is: a time difference between a receive timing that is of a downlink subframe j and that is determined by reception of a downlink signal of the serving cell by the communication device 1700 and a transmit timing that is of an uplink subframe j and that is determined by transmission of an uplink signal to the serving cell by the communication device 1700, where j is an integer greater than or equal to 0.

Optionally, in some embodiments, the uplink TA of the serving cell is: a time difference between receive time when the communication device 1700 receives a downlink subframe k of the serving cell and a transmit timing that is of an uplink subframe k and that is determined by transmission of an uplink signal to the serving cell by the communication device 1700; or a time difference between a receive timing that is of a downlink subframe k and that is determined by reception of a downlink signal by the communication device 1700 and transmit time when the communication device 1700 sends an uplink subframe k to the serving cell, where k is an integer greater than or equal to 0.

Optionally, in some embodiments, the communication unit 1710 is configured to send the uplink signal to the neighboring cell based on the downlink subframe timing, the uplink TA of the neighboring cell, and a cell timing offset, where the cell timing offset is a subframe timing offset between the serving cell and the neighboring cell.

Optionally, in some embodiments, the downlink subframe timing is any one of the following: a downlink subframe timing of a primary cell, a downlink subframe timing of the serving cell, or a downlink subframe timing of the neighboring cell.

Optionally, in some embodiments, the processing unit 1720 is configured to obtain an uplink TA of a target neighboring cell, where the at least one neighboring cell includes a plurality of neighboring cells, and the target neighboring cell is one or more of the plurality of neighboring cells. The communication unit 1710 is configured to send the uplink signal to the plurality of neighboring cells based on the downlink subframe timing and the uplink TA of the target neighboring cell. The target neighboring cell includes: a neighboring cell whose uplink TA is closest to the uplink TA of the serving cell and that is in the plurality of neighboring cells; a neighboring cell with a highest priority in the plurality of neighboring cells, or a neighboring cell with a highest reference signal received power RSRP in the plurality of neighboring cells; or a neighboring cell with a lowest priority in the plurality of neighboring cells, or a neighboring cell with a lowest RSRP in the plurality of neighboring cells.

Optionally, in some embodiments, the processing unit 1720 is configured to perform modulo and/or quantization processing on the uplink TA of the neighboring cell.

The communication device 1700 may implement the steps or procedures performed by the terminal device in the method 600 according to the embodiments of this application, and the communication device 1700 may include units configured to perform the method performed by the terminal device in the method 600 in FIG. 6. In addition, the units in the communication device 1700 and the foregoing other operations and/or functions are separately used to implement corresponding procedures of the method 600 in FIG. 6.

It should be understood that a specific process of performing a corresponding step by each unit has been described in detail in the foregoing method embodiments. For brevity, details are not described herein.

In this possible design, in another possible implementation, the processing unit 1720 is configured to obtain an uplink timing advance TA of a neighboring cell. The communication unit 1710 is configured to receive configuration information of an uplink reference signal from a location management device or a serving cell, where the uplink reference signal is a reference signal sent by the communication device 1700 to the neighboring cell; and send, to the neighboring cell based on a downlink subframe timing and the uplink TA of the neighboring cell, the uplink reference signal indicated by the configuration information of the uplink reference signal.

Optionally, in some embodiments, the processing unit 1720 is configured to prestore one or more of the following information: a correspondence between an identifier of the uplink reference signal and the uplink TA of the neighboring cell; a correspondence between an identifier of a set of the uplink reference signal and the uplink TA of the neighboring cell; a correspondence between an identifier of the neighboring cell and the uplink TA of the neighboring cell; or a correspondence between a set of a plurality of identifiers of the neighboring cell and the uplink TA of the neighboring cell.

Optionally, in some embodiments, the communication unit 1710 is configured to receive one or more of the following information: the correspondence between an identifier of the uplink reference signal and the uplink TA of the neighboring cell; the correspondence between an identifier of a set of the uplink reference signal and the uplink TA of the neighboring cell; the correspondence between an identifier of the neighboring cell and the uplink TA of the neighboring cell; or the correspondence between a set of a plurality of identifiers of the neighboring cell and the uplink TA of the neighboring cell.

Optionally, in some embodiments, the processing unit 1720 is configured to: obtain the uplink TA of the neighboring cell based on the uplink reference signal sent to the neighboring cell and the correspondence between an identifier of the uplink reference signal and the uplink TA of the neighboring cell; obtain the uplink TA of the neighboring cell based on a set to which the uplink reference signal sent to the neighboring cell belongs and the correspondence between an identifier of a set of the uplink reference signal and the uplink TA of the neighboring cell; obtain the uplink TA of the neighboring cell based on the neighboring cell to which the uplink reference signal is sent and the correspondence between an identifier of the neighboring cell and the uplink TA of the neighboring cell; or obtain the uplink TA of the neighboring cell based on the correspondence between a set of a plurality of identifiers of the neighboring cell and the uplink TA of the neighboring cell and a set to which the neighboring cell belongs, where the uplink reference signal is sent to the neighboring cell.

Optionally, in some embodiments, the communication unit 1710 is configured to obtain the downlink subframe timing, where the obtaining the downlink subframe timing specifically includes: receiving information about the downlink subframe timing; or receiving a downlink reference signal, and obtaining the downlink subframe timing based on time of the downlink reference signal, where the downlink reference signal is received from the serving cell or the neighboring cell.

Optionally, in some embodiments, the downlink subframe timing is any one of the following: a downlink subframe timing of a primary cell, a downlink subframe timing of the serving cell, or a downlink subframe timing of the neighboring cell.

Optionally, in some embodiments, the uplink reference signal is a sounding reference signal SRS used for positioning, and the configuration information of the uplink reference signal includes one or more of the following information: an identifier of a resource of the SRS, a quantity of ports of the resource of the SRS, a port number of a phase tracking reference signal PT-RS associated with the resource of the SRS, comb configuration information and a sequence cyclic shift that are of the resource of the SRS, a start symbol index of the resource of the SRS, a quantity of consecutive symbols and a repetition factor that are of the resource of the SRS, an index of a start resource block RB of the resource of the SRS, frequency hopping configuration information of the resource of the SRS, a bandwidth of the SRS, sequence group hopping and sequence hopping that are of the resource of the SRS, periodic configuration information of the resource of the SRS, and spatial filtering information of the resource of the SRS.

Optionally, in some embodiments, the communication unit 1710 is configured to receive the identifier of the neighboring cell from the location management device or the serving cell.

The communication device 1700 may implement the steps or procedures performed by the terminal device in the method 700 according to the embodiments of this application, and the communication device 1700 may include units configured to perform the method performed by the terminal device in the method 700. In addition, the units in the communication device 1700 and the foregoing other operations and/or functions are separately used to implement corresponding procedures of the method 700.

It should be understood that a specific process of performing a corresponding step by each unit has been described in detail in the foregoing method embodiments. For brevity, details are not described herein.

It should be further understood that the communication unit 1710 in the communication device 1700 may alternatively be an input/output interface.

In another possible design, the communication device 1700 may implement the actions performed by a cell (for example, a serving cell or a neighboring cell) in the foregoing method embodiments. In this case, the communication device 1700 may be referred to as a base station or a network device. The network device is used as an example. For example, the communication device 1700 may be a network device, or a chip or a circuit configured in the network device. The communication unit 1710 is configured to perform receiving/sending-related operations on the cell side in the foregoing method embodiments, and the processing unit 1720 is configured to perform processing-related operations on the cell side in the foregoing method embodiments.

In this possible design, in a possible implementation, the communication unit 1710 is configured to: send configuration information of an uplink reference signal to a location management device. The processing unit 1720 is configured to determine an uplink timing advance TA of a neighboring cell. The communication unit 1710 is configured to: send indication information of the uplink TA of the neighboring cell to a terminal device; and receive, from the terminal device, the uplink reference signal indicated by the configuration information of the uplink reference signal.

Optionally, in some embodiments, the communication unit 1710 is configured to send one or more of the following information to the terminal device: a correspondence between an identifier of the uplink reference signal and the uplink TA of the neighboring cell; a correspondence between an identifier of a set of the uplink reference signal and the uplink TA of the neighboring cell; a correspondence between an identifier of the neighboring cell and the uplink TA of the neighboring cell; or a correspondence between a set of a plurality of identifiers of the neighboring cell and the uplink TA of the neighboring cell.

Optionally, in some embodiments, the communication unit 1710 is configured to send information about a downlink subframe timing to the terminal device, where the downlink subframe timing is any one of the following: a downlink subframe timing of a primary cell, a downlink subframe timing of a serving cell, or a downlink subframe timing of the neighboring cell.

Optionally, in some embodiments, the communication unit 1710 is configured to receive a measurement request message from the location management device, where the measurement request message is used to request the serving cell to report time when the uplink reference signal is received.

Optionally, in some embodiments, the processing unit 1720 is configured to: obtain location information of the terminal device, and determine the uplink TA of the neighboring cell based on the location information of the terminal device; determine the uplink TA of the neighboring cell based on transmission of preamble information to the neighboring cell by the terminal device; or obtain an uplink TA of the serving cell and a downlink signal time difference, and determine the uplink TA of the neighboring cell based on the uplink TA of the serving cell and the downlink signal time difference, where the downlink signal time difference is a downlink signal time difference between the uplink TA of the serving cell and the uplink TA of the neighboring cell.

Optionally, in some embodiments, the processing unit 1720 is configured to: obtain the location information of the terminal device in a GPS manner or an E-CID manner; or obtain the location information of the terminal device based on a beam measurement result that is of the neighboring cell and that is reported by the terminal device.

Optionally, in some embodiments, the uplink reference signal is a sounding reference signal SRS used for positioning, and the configuration information of the uplink reference signal includes one or more of the following information: an identifier of a resource of the SRS, a quantity of ports of the resource of the SRS, a port number of a phase tracking reference signal PT-RS associated with the resource of the SRS, comb configuration information and a sequence cyclic shift that are of the resource of the SRS, a start symbol index of the resource of the SRS, a quantity of consecutive symbols and a repetition factor that are of the resource of the SRS, an index of a start resource block RB of the resource of the SRS, frequency hopping configuration information of the resource of the SRS, a bandwidth of the SRS, sequence group hopping and sequence hopping that are of the resource of the SRS, periodic configuration information of the resource of the SRS, and spatial filtering information of the resource of the SRS.

Optionally, in some embodiments, the communication unit 1710 is configured to send the identifier of the neighboring cell to the terminal device.

The communication device 1700 may implement the steps or procedures performed by the cell (for example, the serving cell or the neighboring cell) in the method 700 according to the embodiments of this application, and the communication device 1700 may include units configured to perform the method performed by the cell in the method 700. In addition, the units in the communication device 1700 and the foregoing other operations and/or functions are separately used to implement corresponding procedures of the method 700.

It should be understood that a specific process of performing a corresponding step by each unit has been described in detail in the foregoing method embodiments. For brevity, details are not described herein.

In another possible design, the communication device 1700 may implement the actions performed by the location management device in the foregoing method embodiments. In this case, the communication device 1700 may be referred to as a location management device, for example, may be a location management device, or a chip or a circuit configured in the location management device. The communication unit 1710 is configured to perform receiving/sending-related operations on the location management device side in the foregoing method embodiments, and the processing unit 1720 is configured to perform processing-related operations on the location management device in the foregoing method embodiments.

In this possible design, in a possible implementation, the processing unit 1720 is configured to determine an uplink timing advance TA of a neighboring cell. The communication unit 1710 is configured to: receive configuration information of an uplink reference signal from a serving cell of a terminal device, where the uplink reference signal is a reference signal sent by the terminal device to the neighboring cell; and send the configuration information of the uplink reference signal and indication information of the uplink TA of the neighboring cell to the terminal device.

Optionally, in some embodiments, the communication unit 1710 is configured to send one or more of the following information to the terminal device: a correspondence between an identifier of the uplink reference signal and the uplink TA of the neighboring cell; a correspondence between an identifier of a set of the uplink reference signal and the uplink TA of the neighboring cell; a correspondence between an identifier of the neighboring cell and the uplink TA of the neighboring cell; or a correspondence between a set of a plurality of identifiers of the neighboring cell and the uplink TA of the neighboring cell.

Optionally, in some embodiments, the communication unit 1710 is configured to send information about a downlink subframe timing to the terminal device, where the downlink subframe timing is any one of the following: a downlink subframe timing of a primary cell, a downlink subframe timing of a serving cell, or a downlink subframe timing of the neighboring cell.

Optionally, in some embodiments, the communication unit 1710 is configured to send a measurement request message to the neighboring cell or the serving cell, where the measurement request message is used to request the neighboring cell or the serving cell to report time when the uplink reference signal is received.

Optionally, in some embodiments, the processing unit 1720 is configured to: obtain location information of the terminal device, and determine the uplink TA of the neighboring cell based on the location information of the terminal device; determine the uplink TA of the neighboring cell based on transmission of preamble information to the neighboring cell by the terminal device; or obtain an uplink TA of the serving cell and a downlink signal time difference, and determine the uplink TA of the neighboring cell based on the uplink TA of the serving cell and the downlink signal time difference, where the downlink signal time difference is a downlink signal time difference between the uplink TA of the serving cell and the uplink TA of the neighboring cell.

Optionally, in some embodiments, the processing unit 1720 is configured to: obtain the location information of the terminal device in a GPS manner or an E-CID manner; or obtain the location information of the terminal device based on a beam measurement result that is of the neighboring cell and that is reported by the terminal device.

Optionally, in some embodiments, the uplink reference signal is a sounding reference signal SRS used for positioning, and the configuration information of the uplink reference signal includes one or more of the following information: an identifier of a resource of the SRS, a quantity of ports of the resource of the SRS, a port number of a phase tracking reference signal PT-RS associated with the resource of the SRS, comb configuration information and a sequence cyclic shift that are of the resource of the SRS, a start symbol index of the resource of the SRS, a quantity of consecutive symbols and a repetition factor that are of the resource of the SRS, an index of a start resource block RB of the resource of the SRS, frequency hopping configuration information of the resource of the SRS, a bandwidth of the SRS, sequence group hopping and sequence hopping that are of the resource of the SRS, periodic configuration information of the resource of the SRS, and spatial filtering information of the resource of the SRS.

Optionally, in some embodiments, the communication unit 1710 is configured to send the identifier of the neighboring cell to the terminal device.

The communication device 1700 may implement the steps or procedures performed by the location management device in the method 700 according to the embodiments of this application, and the communication device 1700 may include units configured to perform the method performed by the location management device in the method 700. In addition, the units in the communication device 1700 and the foregoing other operations and/or functions are separately used to implement corresponding procedures of the method 700.

It should be understood that a specific process of performing a corresponding step by each unit has been described in detail in the foregoing method embodiments. For brevity, details are not described herein.

It should be further understood that the processing unit 1720 in the foregoing embodiment may be implemented by a processor or a processor-related circuit, and the communication device 1700 may be implemented by a transceiver or a transceiver-related circuit.

Figure 18:
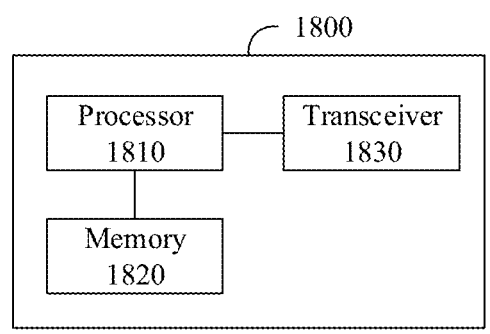
FIG. 18 is another schematic block diagram of a communication device according to an embodiment of this application.

FIG. 18 is a schematic diagram of a communication device 1800 according to an embodiment of this application. The communication device 1800 includes a processor 1810, a memory 1820, and a transceiver 1830. The memory 1820 stores a program. The processor 1810 is configured to execute the program stored in the memory 1820. Execution of the program stored in the memory 1820 enables the processor 1810 to perform related processing steps in the foregoing method embodiments, and enables the processor 1810 controls the transceiver 1830 to perform receiving/sending-related steps in the foregoing method embodiments.

In an implementation, the communication device 1800 is configured to perform the actions performed by the terminal device in the foregoing method embodiments. In this case, the execution of the program stored in the memory 1820 enables the processor 1810 to perform the processing steps on the terminal device side in the foregoing method embodiments, and enables the processor 1810 to control the transceiver 1830 to perform the receiving/sending steps on the terminal device side in the foregoing method embodiments.

In another implementation, the communication device 1800 is configured to perform the actions performed by the location management device in the foregoing method embodiments. In this case, the execution of the program stored in the memory 1820 enables the processor 1810 to perform the processing steps on the location management device side in the foregoing method embodiments, and enables the processor 1810 to control the transceiver 1830 to perform the receiving/sending steps on the location management device side in the foregoing method embodiments.

In an implementation, the communication device 1800 is configured to perform the actions performed by the cell in the foregoing method embodiments. In this case, the execution of the program stored in the memory 1820 enables the processor 1810 to perform the processing steps on the cell side in the foregoing method embodiments, and enables the processor 1810 to control the transceiver 1830 to perform the receiving/sending steps on the cell side in the foregoing method embodiments.

Figure 19:
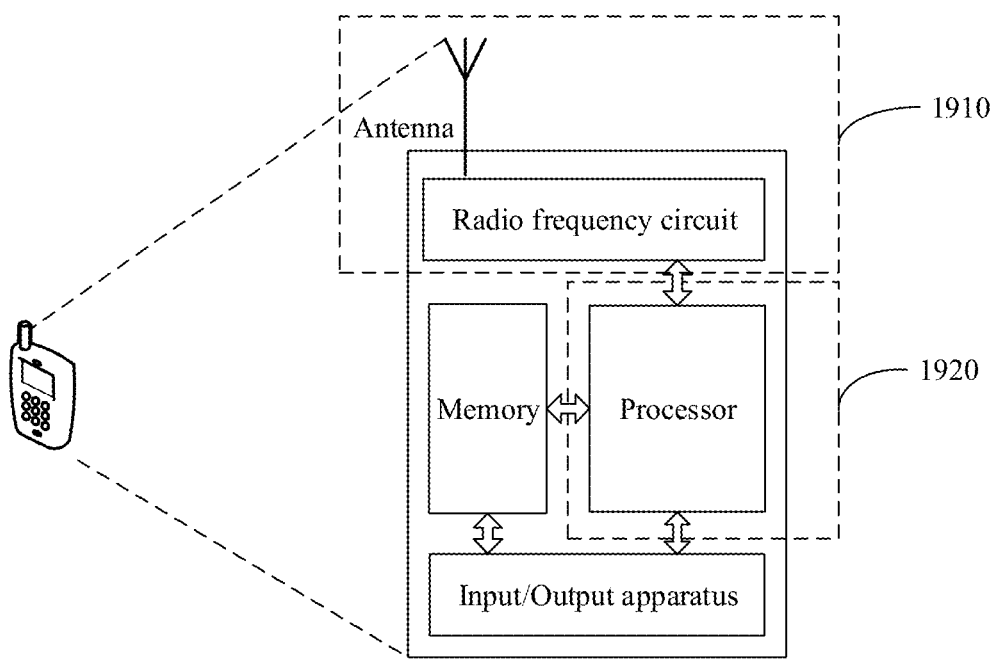
FIG. 19 is a schematic block diagram of a terminal device according to an embodiment of this application.

FIG. 19 is a schematic diagram of a communication device 1900 according to an embodiment of this application. The communication device 1900 may be a terminal device or a chip. The communication device 1900 may be configured to perform the actions performed by the terminal device in the foregoing method embodiments.

When the communication device 1900 is a terminal device, FIG. 19 is a simplified schematic structural diagram of the terminal device. For ease of understanding and illustration, an example in which the terminal device is a mobile phone is used in FIG. 19. As shown in FIG. 19, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data entered by a user and output data to the user. It should be noted that terminal devices of some types may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to outside in a form of an electromagnetic wave by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 19 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in the embodiments of this application.

In this embodiment of this application, the antenna and the radio frequency circuit that have receiving and sending functions may be considered as a transceiver unit of the terminal device, and the processor that has a processing function may be considered as a processing unit of the terminal device.

As shown in FIG. 19, the terminal device includes a transceiver unit 1910 and a processing unit 1920. The transceiver unit 1910 may also be referred to as a transceiver, a transceiver machine, a transceiver apparatus, or the like. The processing unit 1920 may also be referred to as a processor, a processing board, a processing module, a processing apparatus, or the like. Optionally, a component that is in the transceiver unit 1910 and that is configured to implement a receiving function may be considered as a receiving unit, and a component that is in the transceiver unit 1910 and that is configured to implement a sending function may be considered as a sending unit. In other words, the transceiver unit 1910 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmitter circuit, or the like.

For example, in an implementation, the transceiver unit 1910 is further configured to perform the sending operation on the terminal device side in step 640 shown in FIG. 6, and/or the transceiver unit 1910 is further configured to perform other receiving/sending steps on the terminal device side. The processing unit 1920 is configured to perform the processing steps, for example, step 610 to step 630, on the terminal device side in the embodiments of this application.

For another example, in an implementation, the transceiver unit 1910 is further configured to perform the receiving operation on the terminal device side in step 430 shown in FIG. 13, and the transceiver unit 1910 is further configured to perform other receiving/sending steps on the terminal device side.

It should be understood that FIG. 19 is merely an example instead of a limitation. The terminal device including the transceiver unit and the processing unit may not depend on the structure shown in FIG. 19.

When the communication device 1900 is a chip, the chip includes a transceiver unit and a processing unit. The transceiver unit may be an input/output circuit or a communication interface. The processing unit may be a processor, a microprocessor, or an integrated circuit, integrated on the chip.

An embodiment of this application further provides a communication device 2000. The communication device 2000 may be a network device or a chip. The communication device 2000 may be configured to perform the actions performed by the cell or the location management device in the foregoing method embodiments.

Figure 20:
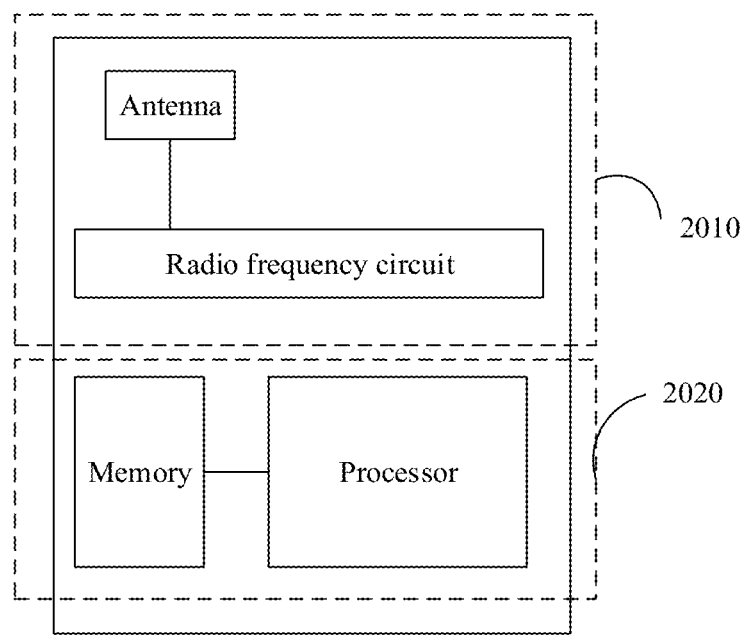
FIG. 20 is a schematic block diagram of a network device according to an embodiment of this application.

When the communication device 2000 is a network device, for example, a base station, FIG. 20 is a simplified schematic structural diagram of the base station. The base station includes a part 2010 and a part 2020. The part 2010 is mainly configured to: receive and send a radio frequency signal, and perform conversion between a radio frequency signal and a baseband signal. The part 2020 is mainly configured to: perform baseband processing, control the base station, and the like. The part 2010 may be usually referred to as a transceiver unit, a transceiver machine, a transceiver circuit, a transceiver, or the like. The part 2020 is usually a control center of the base station, and may usually be referred to as a processing unit, and is configured to control the base station to perform the processing operations on the network device side in the foregoing method embodiments.

The transceiver unit in the part 2010 may also be referred to as a transceiver machine, a transceiver, or the like. The transceiver unit includes an antenna and a radio frequency unit. The radio frequency unit is mainly configured to perform radio frequency processing. Optionally, a component, in the part 2010, that is configured to implement a receiving function may be considered as a receiving unit, and a component that is configured to implement a sending function may be considered as a sending unit. In other words, the part 2010 includes the receiving unit and the sending unit. The receiving unit may also be referred to as a receiver machine, a receiver, a receiver circuit, or the like. The sending unit may be referred to as a transmitter machine, a transmitter, a transmitter circuit, or the like.

The part 2020 may include one or more boards, and each board may include one or more processors and one or more memories. The processor is configured to read and execute a program in the memory to implement a baseband processing function and control the base station. If there are a plurality of boards, the boards may be interconnected to enhance a processing capability. In an optional implementation, the plurality of boards may share one or more processors, or the plurality of boards may share one or more memories, or the plurality of boards may simultaneously share one or more processors.

For example, in an implementation, the transceiver unit in the part 2010 is configured to perform the sending operations on the network device side in step 730 in FIG. 13, and/or the transceiver unit in the part 2010 is further configured to perform other receiving/sending steps on the network device side in the embodiments of this application. The processing unit in the part 2020 is configured to perform the processing steps on the network device side in the embodiments of this application.

For another example, in another implementation, the transceiver unit in the part 2010 is configured to perform the receiving/sending operations on the cell side in step 440, step 450, and step 460 in FIG. 13, and/or the transceiver unit in the part 2010 is further configured to perform other receiving/sending steps on the cell side in the embodiments of this application. The processing unit in the part 2020 is configured to perform the processing steps in step 410, step 420, and step 460 in FIG. 15.

It should be understood that FIG. 20 is merely an example instead of a limitation. The network device including the transceiver unit and the processing unit may not depend on the structure shown in FIG. 20.

When the communication device 2000 is a chip, the chip includes a transceiver unit and a processing unit. The transceiver unit may be an input/output circuit or a communication interface. The processing unit may be a processor, a microprocessor, or an integrated circuit, integrated on the chip.

An embodiment of this application further provides a computer-readable storage medium. The computer-readable storage medium stores a computer program. When the computer program is executed by a computer, the computer is enabled to implement the method on a terminal device side or the method on a network device side in the foregoing method embodiments.

An embodiment of this application further provides a computer program product including instructions. When the instructions are executed by a computer, the computer is enabled to implement the method on a terminal device side or the method on a network device side in the foregoing method embodiments.

An embodiment of this application further provides a system. The system includes the foregoing one or more terminal devices and one or more network devices described above.

For explanations and beneficial effects of related content in any one of the foregoing provided communication devices, refer to the corresponding method embodiment provided above. Details are not described herein again.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in the embodiments of this application is not specifically limited in the embodiments of this application, provided that a program that records code of the method provided in the embodiments of this application can be run to perform communication based on the method provided in the embodiments of this application. For example, the execution body of the method provided in the embodiments of this application may be the terminal device or the network device, or a functional module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to a magnetic storage component (for example, a hard disk, a floppy disk, or a magnetic tape), an optical disc (for example, a compact disc (CD), a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel and various other media that can store, include, and/or carry an instruction and/or data.

It should be understood that, the processor mentioned in this embodiment of this application may be a central processing unit (CPU), or another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be further understood that the memory mentioned in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (Enhanced SDRAM, ESDRAM), a synch-link dynamic random access memory (SLDRAM), and a direct rambus random access memory (DR RAM).

It should be noted that when the processor is a general-purpose processor, a DSP, an ASIC, an FPGA, or another programmable logic device, discrete gate or transistor logic device, or discrete hardware component, the memory (a storage module) is integrated into the processor.

It should be noted that the memory described in this specification aims to include but is not limited to these memories and any memory of another proper type.

A person of ordinary skill in the art may be aware that, various illustrative logical blocks and steps that are described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
obtaining an uplink timing advance (TA) of a serving cell;
obtaining a downlink signal time difference between the serving cell and at least one neighboring cell;
obtaining an uplink TA of the at least one neighboring cell based on the uplink TA of the serving cell and the downlink signal time difference; and
sending an uplink signal to the at least one neighboring cell based on a downlink subframe timing and the uplink TA of the at least one neighboring cell,
wherein
the at least one neighboring cell comprises a plurality of neighboring cells;
the obtaining the uplink TA of the at least one neighboring cell comprises:
obtaining an uplink TA of a target neighboring cell among the plurality of neighboring cells; and
the sending the uplink signal to the at least one neighboring cell comprises:
sending the uplink signal to the plurality of neighboring cells based on the downlink subframe timing and the uplink TA of the target neighboring cell.

2. The method according to claim 1, wherein the uplink TA of the at least one neighboring cell is a sum of the uplink TA of the serving cell and the downlink signal time difference between the serving cell and the at least one neighboring cell.

3. The method according to claim 1, wherein the obtaining the uplink TA of the serving cell comprises:
receiving a timing advance group (TAG) from a network device, wherein the TAG comprises the uplink TA of the serving cell; and
obtaining the uplink TA of the serving cell from the TAG.

4. The method according to claim 1, wherein the uplink TA of the serving cell is any one of:
a time difference between
a receive time when a terminal device receives a downlink subframe i of the serving cell, and
a transmit time when the terminal device sends an uplink subframe i to the serving cell, wherein i is an integer greater than or equal to 0;
a time difference between
a receive timing that is of a downlink subframe j and that is determined by reception of a downlink signal of the serving cell by a terminal device, and
a transmit timing that is of an uplink subframe j and that is determined by transmission of an uplink signal to the serving cell by the terminal device, wherein j is an integer greater than or equal to 0;
a time difference between
a receive time when a terminal device receives a downlink subframe k of the serving cell, and
a transmit timing that is of an uplink subframe k and that is determined by transmission of an uplink signal to the serving cell by the terminal device, wherein k is an integer greater than or equal to 0; or
a time difference between
a receive timing that is of a downlink subframe k and that is determined by reception of a downlink signal by a terminal device, and
a transmit time when the terminal device sends an uplink subframe k to the serving cell.

5. The method according to claim 1, wherein
the sending the uplink signal to the at least one neighboring cell comprises:
sending the uplink signal to the at least one neighboring cell based on the downlink subframe timing, the uplink TA of the at least one neighboring cell, and a cell timing offset, and
the cell timing offset is a subframe timing offset between the serving cell and the at least one neighboring cell.

6. The method according to claim 1, wherein the downlink subframe timing is any one of:
a downlink subframe timing of a primary cell,
a downlink subframe timing of the serving cell, or
a downlink subframe timing of the at least one neighboring cell.

7. The method according to claim 1, wherein
the target neighboring cell comprises at least one of:
a neighboring cell that has an uplink TA closest to the uplink TA of the serving cell and that is in the plurality of neighboring cells;
a neighboring cell with a highest priority in the plurality of neighboring cells, or a neighboring cell with a highest reference signal received power (RSRP) in the plurality of neighboring cells; or
a neighboring cell with a lowest priority in the plurality of neighboring cells, or a neighboring cell with a lowest RSRP in the plurality of neighboring cells.

8. The method according to claim 1, further comprising:
before the sending the uplink signal to the at least one neighboring cell,
performing at least one of modulo processing or quantization processing on the uplink TA of the at least one neighboring cell.

9. A communication device, comprising a processor and a transceiver, wherein
the processor is configured to obtain an uplink timing advance (TA) of a serving cell;
the processor is further configured to obtain a downlink signal time difference between the serving cell and at least one neighboring cell;
the processor is further configured to obtain an uplink TA of the at least one neighboring cell based on the uplink TA of the serving cell and the downlink signal time difference; and
the transceiver is configured to send an uplink signal to the at least one neighboring cell based on a downlink subframe timing and the uplink TA of the at least one neighboring cell,
wherein
the at least one neighboring cell comprises a plurality of neighboring cells;
the processor is further configured to obtain the uplink TA of the at least one neighboring cell by:
obtaining an uplink TA of a target neighboring cell among the plurality of neighboring cells; and
the transceiver is configured to send the uplink signal to the at least one neighboring cell by:

sending the uplink signal to the plurality of neighboring cells based on the downlink subframe timing and the uplink TA of the target neighboring cell.

10. The communication device according to claim 9, wherein the uplink TA of the at least one neighboring cell is a sum of the uplink TA of the serving cell and the downlink signal time difference.

11. The communication device according to claim 9, wherein
the transceiver is configured to receive a timing advance group (TAG) from a network device, wherein the TAG comprises the uplink TA of the serving cell; and
the processor is configured to obtain the uplink TA of the serving cell from the TAG.

12. The communication device according to claim 9, wherein the uplink TA of the serving cell is any one of:
a time difference between
a receive time when the communication device receives a downlink subframe i of the serving cell, and
a transmit time when the communication device sends an uplink subframe i to the serving cell, wherein i is an integer greater than or equal to 0;
a time difference between
a receive timing that is of a downlink subframe j and that is determined by reception of a downlink signal of the serving cell by the communication device, and
a transmit timing that is of an uplink subframe j and that is determined by transmission of an uplink signal to the serving cell by the communication device, wherein j is an integer greater than or equal to 0;
a time difference between
a receive time when the communication device receives a downlink subframe k of the serving cell, and
a transmit timing that is of an uplink subframe k and that is determined by transmission of an uplink signal to the serving cell by the communication device, wherein k is an integer greater than or equal to 0; or
a time difference between
a receive timing that is of a downlink subframe k and that is determined by reception of a downlink signal by the communication device, and
a transmit time when the communication device sends an uplink subframe k to the serving cell.

13. The communication device according to claim 9, wherein
the processor is configured to send the uplink signal to the at least one neighboring cell based on the downlink subframe timing, the uplink TA of the at least one neighboring cell, and a cell timing offset, and
the cell timing offset is a subframe timing offset between the serving cell and the at least one neighboring cell.

14. The communication device according to claim 9, wherein
the target neighboring cell comprises at least one of:
a neighboring cell that has an uplink TA closest to the uplink TA of the serving cell and that is in the plurality of neighboring cells;
a neighboring cell with a highest priority in the plurality of neighboring cells, or a neighboring cell with a highest reference signal received power (RSRP) in the plurality of neighboring cells; or
a neighboring cell with a lowest priority in the plurality of neighboring cells, or a neighboring cell with a lowest RSRP in the plurality of neighboring cells.

15. A communication method, comprising:
obtaining an uplink timing advance (TA) of a serving cell;
obtaining a downlink signal time difference between the serving cell and at least one neighboring cell;
obtaining an uplink TA of the at least one neighboring cell based on the uplink TA of the serving cell and the downlink signal time difference; and
sending an uplink signal to the at least one neighboring cell based on a downlink subframe timing and the uplink TA of the at least one neighboring cell,
wherein the method further comprises:
before the sending the uplink signal to the at least one neighboring cell,
performing modulo processing on the uplink TA of the at least one neighboring cell wherein the modulo processing comprises:

second uplink $TA = \mathrm{mod}(\text{first uplink } TA, T0)$, where
mod( ) indicates a modulo operation,
first uplink TA is the uplink TA of the at least one neighboring cell obtained based on the uplink TA of the serving cell and the downlink signal time difference,
T0 is a time unit granularity, and
second uplink TA is the uplink TA of the neighboring cell obtained by the modulo processing and used in the sending the uplink signal to the at least one neighboring cell.

16. The method according to claim 15, wherein the uplink TA of the at least one neighboring cell is a sum of the uplink TA of the serving cell and the downlink signal time difference between the serving cell and the at least one neighboring cell.

17. The method according to claim 15, wherein the obtaining the uplink TA of the serving cell comprises:
receiving a timing advance group (TAG) from a network device, wherein the TAG comprises the uplink TA of the serving cell; and
obtaining the uplink TA of the serving cell from the TAG.

18. The method according to claim 15, wherein the uplink TA of the serving cell is any one of:
a time difference between
a receive time when a terminal device receives a downlink subframe i of the serving cell, and
a transmit time when the terminal device sends an uplink subframe i to the serving cell, wherein i is an integer greater than or equal to 0;
a time difference between
a receive timing that is of a downlink subframe j and that is determined by reception of a downlink signal of the serving cell by a terminal device, and
a transmit timing that is of an uplink subframe j and that is determined by transmission of an uplink signal to the serving cell by the terminal device, wherein j is an integer greater than or equal to 0;
a time difference between
a receive time when a terminal device receives a downlink subframe k of the serving cell, and
a transmit timing that is of an uplink subframe k and that is determined by transmission of an uplink signal to the serving cell by the terminal device, wherein k is an integer greater than or equal to 0; or
a time difference between
a receive timing that is of a downlink subframe k and that is determined by reception of a downlink signal by a terminal device, and
a transmit time when the terminal device sends an uplink subframe k to the serving cell.

19. The method according to claim 15, wherein
the at least one neighboring cell comprises a plurality of neighboring cells;
the obtaining the uplink TA of the at least one neighboring cell comprises:
   obtaining an uplink TA of a target neighboring cell among the plurality of neighboring cells;
the sending the uplink signal to the at least one neighboring cell comprises:
   sending the uplink signal to the plurality of neighboring cells based on the downlink subframe timing and the uplink TA of the target neighboring cell; and
the target neighboring cell comprises at least one of:
   a neighboring cell that has an uplink TA closest to the uplink TA of the serving cell and that is in the plurality of neighboring cells;
   a neighboring cell with a highest priority in the plurality of neighboring cells, or a neighboring cell with a highest reference signal received power (RSRP) in the plurality of neighboring cells; or
   a neighboring cell with a lowest priority in the plurality of neighboring cells, or a neighboring cell with a lowest RSRP in the plurality of neighboring cells.

20. The method according to claim 15, wherein the downlink subframe timing is any one of:
   a downlink subframe timing of a primary cell,
   a downlink subframe timing of the serving cell, or
   a downlink subframe timing of the at least one neighboring cell.

* * * * *